US011777950B2

(12) United States Patent
Pegg et al.

(10) Patent No.: US 11,777,950 B2
(45) Date of Patent: *Oct. 3, 2023

(54) METHODS AND SYSTEMS FOR AUTHENTICATING A REPORTED GEOLOCATION OF A MOBILE DEVICE

(71) Applicant: Verizon Patent and Licensing Inc., Basking Ridge, NJ (US)

(72) Inventors: Antony Pegg, East Petersburg, PA (US); Daniel Mandle, Boulder, CO (US); Michael Wille, Denver, CO (US); Christopher Benton Wood, Broomfield, CO (US); Jeff Medaugh, Littleton, CO (US); Marc Bernardini, Englewood, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/500,523

(22) Filed: Oct. 13, 2021

(65) Prior Publication Data

US 2022/0038465 A1 Feb. 3, 2022

Related U.S. Application Data

(63) Continuation of application No. 16/048,221, filed on Jul. 27, 2018, now Pat. No. 11,178,156.

(51) Int. Cl.
*H04L 9/40* (2022.01)
*H04W 12/06* (2021.01)
*G06F 16/29* (2019.01)

(52) U.S. Cl.
CPC ............ *H04L 63/107* (2013.01); *G06F 16/29* (2019.01); *H04L 63/0876* (2013.01); *H04L 63/105* (2013.01); *H04W 12/06* (2013.01)

(58) Field of Classification Search
CPC . H04L 63/0876; H04L 63/105; H04L 63/107; H04W 12/06
See application file for complete search history.

(56) References Cited

U.S. PATENT DOCUMENTS 7,231,657 B2 6/2007 Honarvar et al.
8,584,219 B1 11/2013 Toole et al.
(Continued)

OTHER PUBLICATIONS

D. Margaria, B. Motella, M. Anghileri, J. -J. Floch, I. Fernandez-Hernandez and M. Paonni, "Signal Structure-Based Authentication for Civil GNSSs: Recent Solutions and Perspectives," in IEEE Signal Processing Magazine, vol. 34, No. 5, pp. 27-37, Sep. 2017. (Year: 2017).*

(Continued)

Primary Examiner — Kari L Schmidt

(57) ABSTRACT

An illustrative geolocation authentication system designates a movement feasibility corroboration factor as a location corroboration factor for the geolocation authentication system to authenticate geolocations of mobile devices. Based on the designating of the movement feasibility corroboration factor, the geolocation authentication system determines a first reported geolocation of a mobile device associated with a first time and a second reported geolocation of the mobile device associated with a second time. Given that the mobile device is located at a true geolocation at the second time, the geolocation authentication system then determines, based on the first and second reported geolocations of the mobile device, a feasibility metric indicative of a likelihood that the second reported geolocation of the mobile device is the true geolocation at the second time. Corresponding methods and systems are also disclosed.

20 Claims, 11 Drawing Sheets

(56) References Cited

U.S. PATENT DOCUMENTS

| | | | |
|---|---|---|---|
| 8,839,358 | B2 | 9/2014 | Strauss et al. |
| 8,905,303 | B1 | 12/2014 | Ben Ayed |
| 8,994,591 | B2* | 3/2015 | Dupray ................. H04W 64/00 |
| | | | 342/465 |
| 9,142,086 | B2 | 9/2015 | Porco |
| 9,143,932 | B1 | 9/2015 | Feldman et al. |
| 9,298,831 | B1 | 3/2016 | Heldt et al. |
| 9,955,359 | B2* | 4/2018 | Monaghan ............ H04W 4/025 |
| 9,967,750 | B1 | 5/2018 | Fernandez et al. |
| 9,979,713 | B2 | 5/2018 | Novack |
| 10,015,171 | B1 | 7/2018 | Vardy et al. |
| 10,057,227 | B1 | 8/2018 | Hess et al. |
| 10,136,253 | B1* | 11/2018 | Monteleone ............. G07C 1/22 |
| 10,516,676 | B2 | 12/2019 | Kundu et al. |
| 10,574,704 | B1* | 2/2020 | Flowerday .......... H04L 63/0407 |
| 10,601,800 | B2 | 3/2020 | Kao et al. |
| 10,629,039 | B1 | 4/2020 | Aldover et al. |
| 10,999,299 | B2 | 5/2021 | Yang et al. |
| 2008/0242305 | A1* | 10/2008 | Kahlert ................. H04W 36/32 |
| | | | 455/442 |
| 2009/0312039 | A1 | 12/2009 | Zou et al. |
| 2012/0084131 | A1* | 4/2012 | Bergel ............... G06Q 30/0225 |
| | | | 705/14.26 |
| 2012/0142335 | A1 | 6/2012 | Chiou et al. |
| 2013/0031598 | A1 | 1/2013 | Whelan et al. |
| 2014/0096215 | A1 | 4/2014 | Hessler |
| 2014/0159952 | A1 | 6/2014 | Fitzgerald et al. |
| 2014/0171106 | A1* | 6/2014 | Cheng ................. H04W 64/006 |
| | | | 455/456.1 |
| 2014/0274116 | A1* | 9/2014 | Xu ......................... G01S 11/06 |
| | | | 455/456.1 |
| 2015/0038114 | A1 | 2/2015 | Low et al. |
| 2015/0038162 | A1 | 2/2015 | Duleba et al. |
| 2015/0072714 | A1 | 3/2015 | Froehlich et al. |
| 2015/0087303 | A1 | 3/2015 | Hillary et al. |
| 2015/0127536 | A1 | 5/2015 | Van Den Broeck et al. |
| 2015/0227926 | A1* | 8/2015 | Grigg ................... G06Q 20/401 |
| | | | 705/64 |
| 2016/0019237 | A1 | 1/2016 | Dan et al. |
| 2016/0026779 | A1 | 1/2016 | Grigg et al. |
| 2016/0105427 | A1* | 4/2016 | Bobbitt ................ H04L 9/3271 |
| | | | 713/158 |
| 2016/0135014 | A1 | 5/2016 | Alharayeri |
| 2016/0135046 | A1 | 5/2016 | John Archibald et al. |
| 2016/0203211 | A1 | 7/2016 | Milton et al. |
| 2017/0150318 | A1 | 5/2017 | Mappus et al. |
| 2017/0359355 | A1 | 12/2017 | Wang et al. |
| 2018/0040011 | A1 | 2/2018 | Milton |
| 2018/0158455 | A1 | 6/2018 | Georges et al. |
| 2018/0176722 | A1* | 6/2018 | Fiatal ..................... H04W 4/02 |
| 2018/0316653 | A1 | 11/2018 | Kanza |

OTHER PUBLICATIONS

Jeongyeup Paek et al. Energy-efficient rate-adaptive GPS-based positioning for smartphones. In Proceedings of the 8th international conference on Mobile systems, applications, and services (MobiSys '10). Association for Computing Machinery, New York, NY, USA, 299-314. (Year: 2010).*

B. Shivhare, G. Sharma, R. S. Kushwah and S. P. S. Kushwah, "Using Geo-location method for lost node in location based services," 2015 International Conference on Communication Networks (ICCN), Gwalior, India, 2015, pp. 356-360. (Year: 2015).*

Kulkarni, et al., "Mobidict: A mobility prediction system leveraging realtime location data streams", Proceedings of the 7th ACM SIGSPATIAL International Workshop on GeoStreaming. 2016, pp. 1-10. (Year: 2016).

Xu, et al., "A Survey for Mobility Big Data Analytics for Geolocation Prediction", in IEEE Wireless Communications, vol. 24, No. 1, pp. 111-119, Feb. 2017. (Year: 2017).

* cited by examiner

CUSTOMIZED AUTHENTICATION SETTINGS TOOL

| Designate | Location Corroboration Factors | Weight Values |
|---|---|---|
| | Reported Corroboration Factors | |
| ☐ | Reported coordinates | ___ % |
| ☑ | Raw GPS signaling | 10 % |
| | Signal Strength Corroboration Factors | |
| ☐ | 3G cell towers | ___ % |
| ☑ | 4G cell towers | 25 % |
| ☑ | Wireless local area networks | 15 % |
| ☐ | Bluetooth beacons | ___ % |
| ☐ | Barometric pressure | ___ % |
| | Signal Detection Corroboration Factors | |
| ☐ | 3G cell towers | ___ % |
| ☑ | 4G cell towers | 25 % |
| ☑ | Wireless local area networks | 15 % |
| ☐ | Bluetooth beacons | ___ % |
| | Device Detection Corroboration Factors | |
| ☐ | 3G cell towers | ___ % |
| ☐ | 4G cell towers | ___ % |
| ☐ | Wireless local area networks | ___ % |
| ☐ | Bluetooth beacons | ___ % |
| | Movement Feasibility Corroboration Factors | |
| ☑ | Tracked location | 10 % |
| ☐ | Predicted routines | ___ % |

702 — Designate column; 704 — Location Corroboration Factors column; 706 — Weight Values

METHODS AND SYSTEMS FOR AUTHENTICATING A REPORTED GEOLOCATION OF A MOBILE DEVICE

RELATED APPLICATIONS

This application is a continuation application of U.S. patent application Ser. No. 16/048,221 filed on Jul. 27, 2018, and entitled "Methods and Systems for Authenticating a Reported Geolocation of a Mobile Device", which is hereby incorporated by reference in its entirety.

BACKGROUND INFORMATION

Use of mobile devices has proliferated in recent years. Because many of these mobile devices include hardware and software for determining and reporting real-time geolocations of the mobile devices, various applications using such geolocation data have been developed and have gained popularity. For example, mapping software and other mobile applications help users navigate the world, find and access services and/or people based on their real-time geolocations, and even contribute real-time location data to crowd-sourced databases used by others (e.g., real-time traffic data, etc.).

In some examples, a mobile application may be configured to report a geolocation of a mobile device, and the reported geolocation of the mobile device may be used to provide a product, a service, or a feature. For example, the reported geolocation may be used to provide location-based services and/or features.

While mobile devices may be capable of reporting geolocations for various purposes, users of mobile devices may, in some examples, have an incentive and an ability to configure their mobile devices to falsify or "spoof" reported geolocation data. As such, it may be difficult to confidently determine whether the users and mobile devices are truly located where they are reported to be.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7 and 8 illustrate exemplary aspects of a customized authentication settings tool used to facilitate the client of FIG. 6 in providing user input to the geolocation authentication system of FIG. 1 according to principles described herein.

DETAILED DESCRIPTION OF PREFERRED EMBODIMENTS

Figure 1:
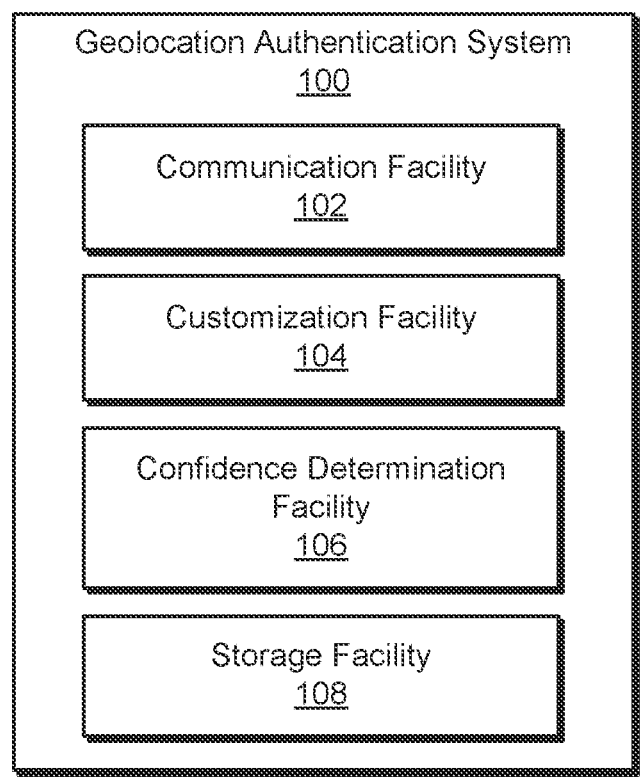
FIG. 1 illustrates an exemplary geolocation authentication system for authenticating a reported geolocation of a mobile device according to principles described herein.

Methods and systems for authenticating a reported geolocation of a mobile device are described herein. For example, as will be described in more detail below, an exemplary geolocation authentication system may receive user input representative of customized authentication settings that designate a location corroboration factor from a plurality of location corroboration factors that correspond to independent ways of determining geolocations of mobile devices. Various types of location corroboration factors corresponding to various independent ways of determining geolocations of mobile devices will be described and illustrated in detail below.

The geolocation authentication system may receive, from a mobile device located at a true geolocation, a reported geolocation of the mobile device. For example, the reported geolocation may be the true geolocation at which the mobile device is located, or may be a false (e.g., spoofed) geolocation distinct from the true geolocation at which the mobile device is located. The geolocation authentication system may determine whether the reported geolocation is the true geolocation, or, at least, may determine a confidence metric representative of a likelihood that the reported geolocation is the true geolocation.

To this end, the geolocation authentication system may access, in response to the receiving of the reported geolocation, a datapoint that characterizes a correlation between the reported geolocation of the mobile device and the true geolocation of the mobile device. The accessed datapoint may provide information tending either to indicate that it is likely that the reported geolocation is the true geolocation (i.e., that there is a strong correlation between the reported geolocation and the true geolocation), or to indicate that it is unlikely that the reported geolocation is the true geolocation (i.e., that there is a weak correlation or no correlation between the reported geolocation and the true geolocation). In some examples, the accessed datapoint may characterize the correlation between the reported geolocation and the true geolocation based on the location corroboration factor designated by the customized authentication settings. The geolocation authentication system may then determine, based on the datapoint, a custom confidence metric representative of a likelihood that the reported geolocation is the true geolocation.

In some examples, as will be described below, the geolocation authentication system may determine the custom confidence metric based on the datapoint and further based on various other datapoints that further characterize the correlation between the reported geolocation and the true geolocation based on various additional location corroboration factors further designated by the customized authentication settings received in the user input. Additionally, each of the datapoints may be weighted together in a customized fashion to determine the custom confidence metric in such examples, as will be described.

Methods and systems for authenticating a reported geolocation of a mobile device described herein represent an improvement over conventional geolocation systems in terms of efficacy and/or reliability. For example, certain conventional methods and systems are not configured to detect whether reported geolocations may possibly be false (i.e., spoofed), making such conventional methods and systems potentially ineffective and/or unreliable in contexts where end users of the mobile devices may have incentive to report false geolocations. In such contexts, it may be desirable for methods and systems identifying and tracking geolocations of mobile devices to authenticate the reported geolocations of the mobile devices, such as by determining a confidence that the reported geolocations are accurate and not spoofed.

For example, various law enforcement organizations that track parolees, defendants who are on bail or on bond before a court proceeding, criminal suspects, and so forth may benefit by not only determining where certain mobile devices report to be, but also determining a confidence level that the mobile devices are not spoofing the reported locations to mask the true locations of the mobile devices and the users associated with them. Other government agencies may benefit in similar ways. For example, emergency response systems may prevent life-threatening situations (e.g., when someone calls in a SWAT team on a location where the person is not actually located, etc.) by using methods and systems described herein for authenticating reported geolocations.

Non-governmental systems and organizations may similarly benefit from methods and systems described herein for authenticating reported geolocations of mobile devices. For example, such authentication may help prevent fraud in various situations where incentives or services are provided to users based on their geolocations (e.g., gambling services provided only to users located in particular states, ride-hailing services charging users and paying drivers based on routes actually traveled, augmented reality games in which points are awarded for physically arriving at particular locations, etc.). As another example, geolocation authentication provided by methods and systems described herein may be useful for tracking service personnel to validate that services were actually performed (e.g., tracking medical personnel who visit patients, parcel delivery persons delivering packages, etc.).

In some examples, having access to data to authenticate a reported geolocation of a mobile device may even be important long after the fact (e.g., rather than or in addition to accessing the data in real time). For example, authenticated data proving the whereabouts of a government agent (e.g., a law enforcement agent, a crime scene investigator, etc.) may be valuable evidence years later at a court trial where the agent's investigation is in dispute.

In still other examples, authentication may be desirable in contexts involving high-value items even if there is no clear incentive for fraud or for spoofing a location of a mobile device. For example, it may be desirable to track transfer of valuable items (e.g., large machines such as magnetic resonance imaging ("MRI") machines, sensitive items such as organs and/or blood intended for transplant, etc.) using a higher level of security and/or authentication than might be acceptable for tracking transfer of other types of items. As another example, mobile devices associated with vehicles (e.g., Internet-of-Things ("IoT") devices embedded in the vehicles) may be tracked and authenticated to provide reliable self-driving services, frictionless check-in for vehicle maintenance and repair services, and so forth.

Methods and systems for authenticating a reported geolocation of a mobile device described herein are also advantageous in comparison to certain conventional methods and/or systems that may perform certain basic checks to attempt to authenticate reported geolocations of mobile devices. For example, various types of datapoints that are described herein as helping to characterize the correlation between a reported geolocation and a true geolocation of a mobile device have not been employed by any conventional method or system, and yet are highly effective at facilitating geolocation authentication in various customizable applications. Additionally, providing a confidence metric that is customized in accordance with customized authentication settings provided in user input provides clients of a geolocation authentication service (and/or others responsible for selecting customized authentication settings) significant flexibility and readily improvable operability for specific applications. For example, the customizability provided by systems and methods described herein may allow for authentication changes to be made readily and responsively as technologies change and/or as people attempting to spoof various signaling become more sophisticated.

Moreover, methods and systems described herein may be employed to authenticate reported geolocations of mobile devices in any of these or various other scenarios without requiring any additional hardware (e.g., proprietary hardware, radio frequency identification ("RFID") tags, base stations, etc.). Moreover, the authentication may result in a custom confidence metric indicative of the likelihood that a reported geolocation of a mobile device is genuine (i.e., not spoofed) in accordance with various customizable aspects that may be important to a party determining the geolocation due to that party's unique needs and context. In some examples, the methods and systems for authenticating a reported geolocation of a mobile device described herein may be provided to clients as part of a customizable geolocation authentication service, as will be described in more detail below. Such clients may benefit by enjoying competitive advantages, preventing fraud, providing more safety to employees and/or those they serve, and in various other ways as will be made apparent by the description below.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geolocation authentication system 100 ("system 100") for authenticating a reported geolocation of a mobile device. As shown, system 100 may include, without limitation, a communication facility 102, a customization facility 104, a confidence determination facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, facilities 102 through 108 may be distributed between multiple devices and/or multiple locations as may serve a particular implementation. Additionally, one or more of facilities 102 through 108 may be omitted from system 100 in certain implementations, while additional facilities may be included within system 100 in the same or other implementations.

In certain implementations, facilities 102 through 108 may be configured to operate in real time so as to determine a custom confidence metric representative of a likelihood that a reported geolocation is a true geolocation immediately as user input, reported location data, and/or corroborating location data are accessed and received. In this way, one or more mobile devices may be geolocated and/or continuously tracked as the devices move in real time, or the location data and/or custom confidence metrics may be stored for later use. As used herein, operations may be performed in "real time" when they are performed immediately and without undue delay. For example, real-time data processing operations associated with authenticating a reported geolocation of a mobile device may be completed while the mobile device is located (or is at least expected to be located) at the reported geolocation, even if there is some amount of delay such as a few seconds.

Each of facilities 102 through 108 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. Each of facilities 102 through 108 will now be described in more detail.

Communication facility 102 may be configured to perform various operations associated with requesting, retrieving, and/or otherwise accessing or receiving input data for processing by system 100. For example, communication facility 102 may be configured to receive a reported geolocation of a mobile device (i.e., to receive data representative of such a reported geolocation) while the mobile device is located at a true geolocation that may or may not correlate to the reported geolocation (e.g., depending on if the reported geolocation is being spoofed or otherwise falsified). In response to receiving the reported geolocation from the mobile device, communication facility 102 may further be configured to access a datapoint that characterizes the correlation between the reported geolocation of the mobile device and the true geolocation of the mobile device. For example, the accessed datapoint may include any suitable amount or form of data that provides evidence that the true geolocation either correlates to (i.e., is the same or approximately the same as), or fails to correlate to (i.e., is significantly different from), the reported geolocation received from the mobile device. As will be described below, comparing the datapoint (e.g., and other independent datapoints in certain implementations) with data representative of the reported geolocation may allow system 100 to determine a confidence level that the reported geolocation correlates to the true geolocation (i.e., that the mobile device is providing accurate, rather than falsified, information about its current geolocation).

In certain implementations, it may be desirable to process the reported geolocation and/or one or more datapoints accessed by communication facility 102 in accordance with authentication settings selected by a person who wishes to use system 100 to identify and/or track a geolocation of the mobile device and/or a user thereof. For example, the person may be a client of a geolocation authentication service provided by system 100, and the accessed datapoint may characterize the correlation between the reported geolocation and the true geolocation based on a location corroboration factor designated within customized authentication settings provided by the client.

To this end, customization facility 104 may be configured to perform various operations associated with identifying such customized authentication settings and providing the settings to confidence determination facility 106 for processing. For example, customization facility 104 may receive (e.g., identify, access, etc.) user input representative of customized authentication settings that designate one or more location corroboration factors from a plurality of location corroboration factors that correspond to independent ways of determining geolocations of mobile devices. The location corroboration factors designated within the customized authentication settings (e.g., selected or designated by the client associated with the geolocation authentication service provided by system 100) may correspond with any of various ways of determining geolocations of mobile devices. For example, as will be described in more detail below, designated location corroboration factors may include signal detection corroboration factors that correspond to determining the geolocations of the mobile devices based on whether the mobile devices report detecting expected wireless signals, signal strength corroboration factors that correspond to determining the geolocations of the mobile devices based on whether the mobile devices report detecting wireless signals at expected signal strengths, movement feasibility corroboration factors that correspond to determining the geolocations of the mobile devices based on whether the mobile devices report feasible movements, and/or other suitable location corroboration factors based on data provided by the mobile device or any other suitable systems or devices.

Along with representing customized authentication settings designating location corroboration factors, the user input received by customization facility 104 may further represent other customization aspects that will be described in more detail below, such as weight values corresponding to each location corroboration factor, access levels corresponding to different custom confidence metrics, and the like. Based on the user input requested and received, customization facility 104 may provide the customized authentication settings to confidence determination facility 106 and/or to other facilities of system 100 not explicitly shown for the settings to be used in performing any of the operations described herein.

Confidence determination facility 106 may be configured to determine a custom confidence metric based on the one or more datapoints accessed by communication facility 102. The custom confidence metric may be representative of a likelihood that the reported geolocation is the true geolocation based on datapoints associated with location corroboration factors designated in the customized authentication settings and, in some examples, in accordance with other data included in the customized authentication settings (e.g., in accordance with designated weight values, etc.). Confidence determination facility 106 may determine the custom confidence metric in any suitable way, examples of which will be provided below.

Confidence determination facility 106 may be configured to provide the determined custom confidence metric (i.e., to provide data representative of the custom confidence metric) to any facility of system 100 or to any other suitable system configured to make use of the custom confidence metric. For instance, the custom confidence metric may be provided to storage facility 108 for long or short-term storage, to a mobile application that may be configured to provide a level of access to the mobile device user based on the custom confidence metric, to a display or system associated with the geolocation authentication service (e.g., for presentation to the client or to an agent of the client), or to any other system or facility for any other purpose as may serve a particular implementation.

Storage facility 108 may store user input data, customized authentication settings, reported geolocations of mobile devices, datapoints characterizing correlations between reported geolocations and true geolocations, custom confidence metrics, and the like. Additionally or alternatively, storage facility 108 may store program instructions for performing any of the operations described herein and/or any other data received, generated, managed, maintained, used, and/or transmitted by facilities 102 through 106 as may serve a particular implementation.

Figure 2:
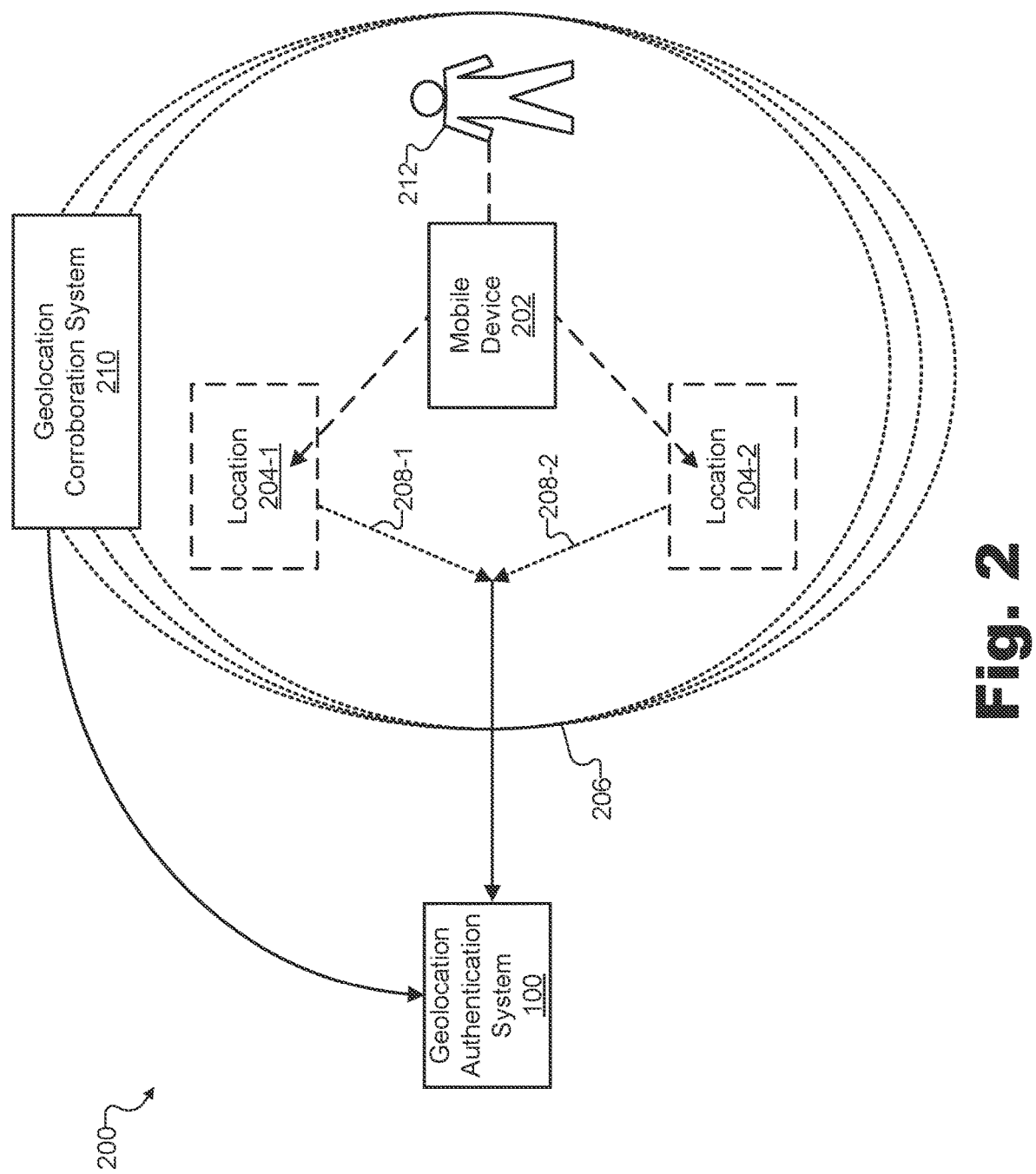
FIG. 2 illustrates an exemplary configuration in which the geolocation authentication system of FIG. 1 may operate to authenticate a reported geolocation of a mobile device according to principles described herein.

FIG. 2 illustrates an exemplary configuration 200 in which the geolocation authentication system 100 of FIG. 1 may operate to authenticate a reported geolocation of a mobile device 202. As shown in configuration 200, mobile device 202 may be located at a location 204 (e.g., location 204-1 or location 204-2) that may reside within a wireless footprint 206 associated with one or more wireless networks (e.g., mobile data networks, wireless local area networks ("WLANs"), etc.) and/or wireless signals (e.g., global positioning system ("GPS") signals, Bluetooth signals, Wi-Fi signals, etc.).

Mobile device 202 may be communicatively coupled to system 100 such that mobile device 202 may transmit data 208 (e.g., data 208-1 or 208-2) representative of a reported geolocation of mobile device 202 to system 100. For example, if mobile device 202 is located at location 204-1, mobile device 202 may transmit data 208-1, which may indicate that mobile device 202 is located at location 204-1 and may thus also be referred to as reported geolocation 208-1. Similarly, if mobile device 202 is located at location 204-2, mobile device 202 may transmit data 208-2, which may indicate that mobile device 202 is located at location 204-2 and may thus also be referred to as reported geolocation 208-2. While not explicitly shown in FIG. 2, it will be understood that data 208 (e.g., reported geolocation 208-1 or 208-2) may be transmitted from mobile device 202 to system 100 by way of one or more networks (e.g., including wireless network(s) with which wireless footprint 206 corresponds) or by way of any other suitable communication carriers or technologies as may serve a particular implementation.

Reported geolocations 208 may take any form as may serve a particular implementation. For example, reported geolocations 208 may be implemented as location coordinates (e.g., latitude and longitude coordinates or the like) that may have been determined by mobile device 202 based on raw GPS signals received from different satellites, based on raw triangulation signals from different cell towers, or based on other suitable signals. In other examples, reported geolocations 208 may be implemented by the raw signals themselves (e.g., the raw GPS signals, the raw triangulation signals, etc.) such that system 100 may process the raw signals to determine the location coordinates.

As mentioned above, it may be possible in certain examples that mobile device 202 could transmit falsified (i.e., spoofed) data to system 100. For instance, in one example, mobile device 202 could be physically located at location 204-1 (referred to herein as the "true geolocation" of mobile device 202) while sending spoofed data indicating reported geolocation 208-2. As such, when system 100 receives any reported geolocation 208, system 100 may be configured to authenticate the received reported geolocation 208 to determine a likelihood that it is genuine and not falsified (i.e., to determine whether the true geolocation of mobile device 202 correlates to the reported geolocation 208 received).

To this end, system 100 may be configured to access one or more datapoints that characterize a correlation between the reported geolocation 208 that system 100 has received and the true geolocation. Such datapoints may be accessed from any suitable source and may take any form as may serve a particular implementation. For example, exemplary datapoints may be accessed from storage facility 108 of system 100 itself, or from other systems and/or devices independent from system 100 as will be described in more detail below.

One exemplary datapoint may be the reported geolocation 208 itself that has been received from mobile device 202. For this reason, implementations in which reported geolocation 208 is implemented using raw signals from which location coordinates may be determined (rather than actual location coordinates) may be advantageous for providing a valuable datapoint. These implementations make it more difficult to spoof reported geolocation 208 because, even if location coordinates to be spoofed are known, it may be difficult to determine and artificially recreate the raw signals (e.g., the signal content, the arrival timing relationships thereof, etc.) that, when analyzed by system 100, will correspond to the location coordinates intended to be spoofed.

Along with reported geolocation 208, system 100 may further access one or more additional datapoints that are associated with location corroboration factors. As used herein, location corroboration factors may refer to any of various independent ways of determining geolocations of mobile devices, and datapoints characterizing the correlation between reported geolocations and true geolocations of such mobile devices may each include any amount of data in any suitable form.

Figure 3:
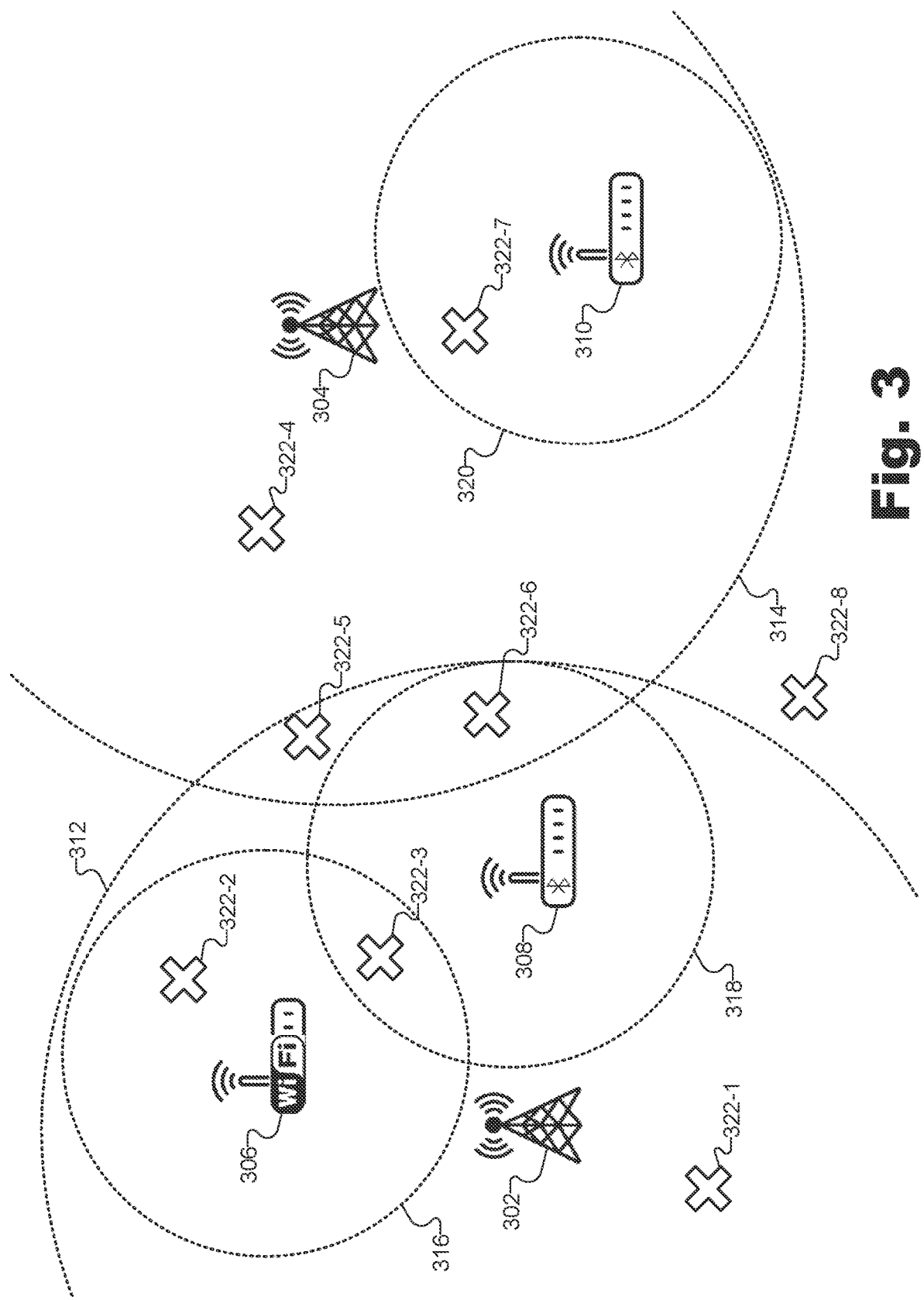
FIGS. 3 through 5 illustrate exemplary independent ways of determining geolocations of mobile devices based on exemplary location corroboration factors according to principles described herein.
Figure 4:
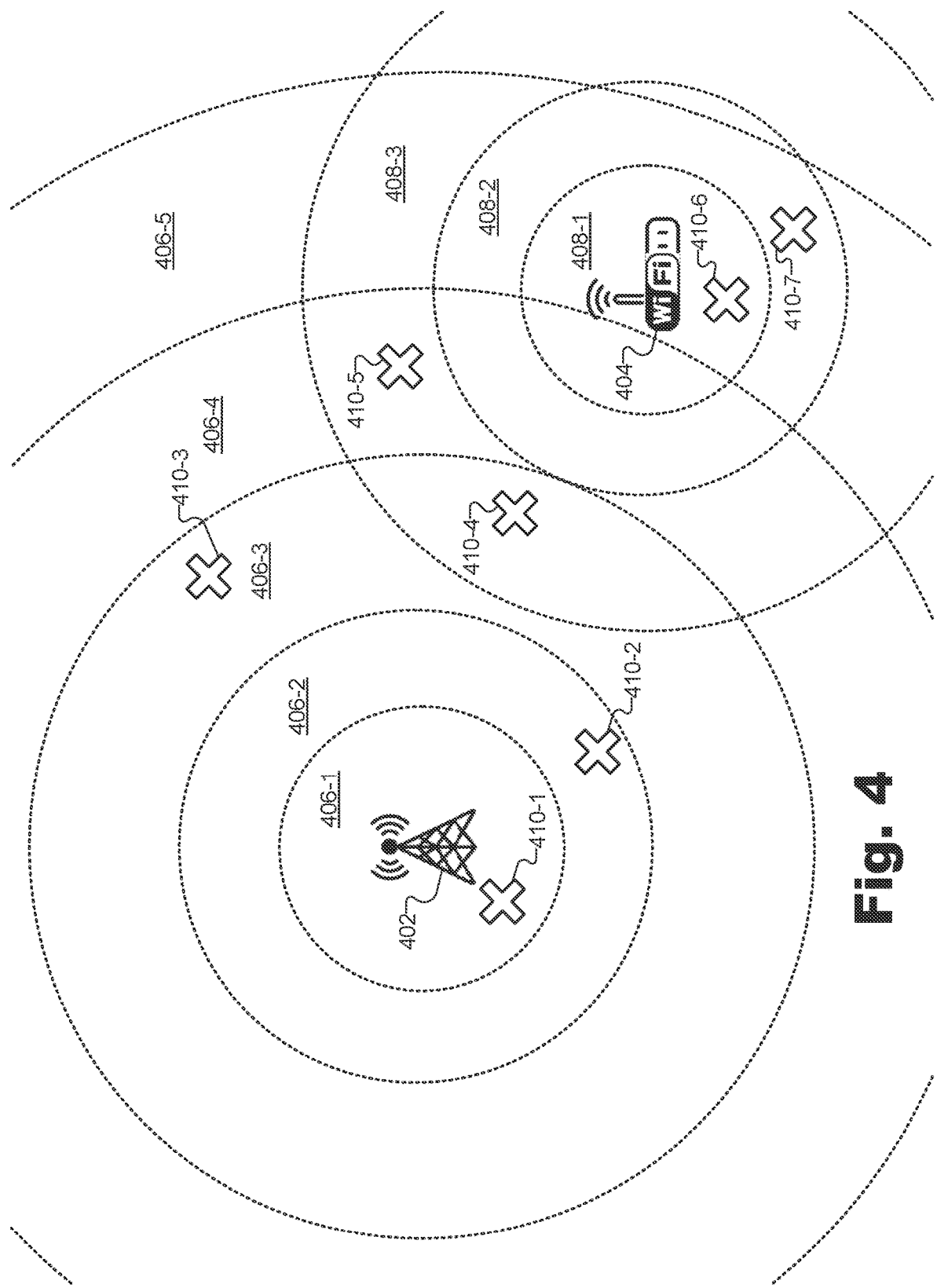
Figure 5:
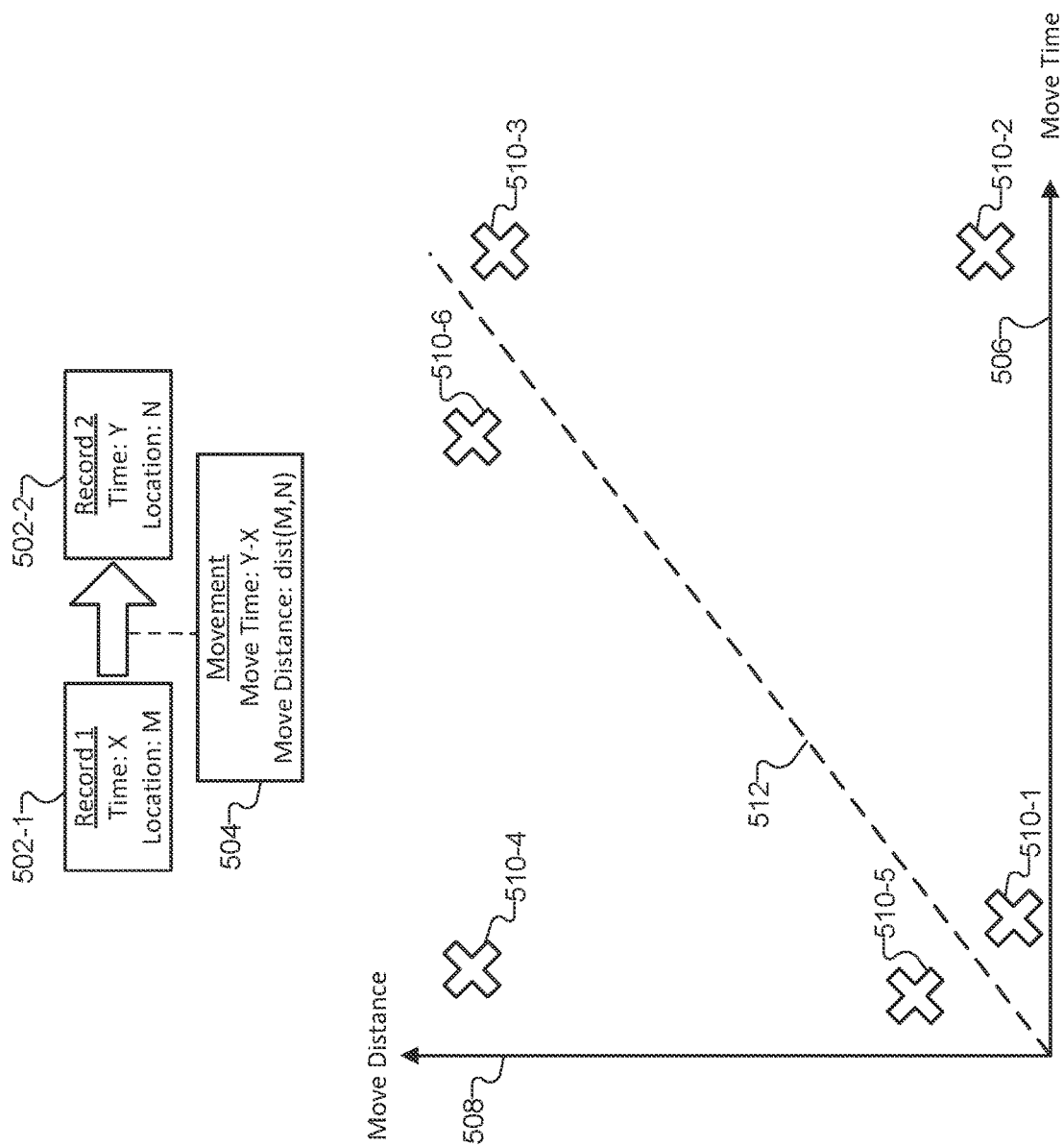

To illustrate, FIGS. 3 through 5 show exemplary independent ways of determining geolocations of mobile devices based on exemplary location corroboration factors. Specifically, FIG. 3 illustrates how system 100 may employ a location corroboration factor referred to herein as a signal detection corroboration factor to authenticate a reported geolocation of a mobile device, FIG. 4 illustrates how system 100 may employ a location corroboration factor referred to herein as a signal strength corroboration factor to authenticate the reported geolocation, and FIG. 5 illustrates how system 100 may employ a location corroboration factor referred to herein as a movement feasibility corroboration factor to authenticate the reported geolocation.

Referring to FIG. 3, a plurality of wireless signal generators including a cell tower 302, a cell tower 304, a Wi-Fi router 306, a stationary Bluetooth beacon 308, and a stationary Bluetooth beacon 310 is shown to generate respective wireless footprints 312 (corresponding to cell tower 302), 314 (corresponding to cell tower 304), 316 (corresponding to WiFi router 306), 318 (corresponding to stationary Bluetooth beacon 308), and 320 (corresponding to stationary Bluetooth beacon 310). The signal detection corroboration factor illustrated by FIG. 3 may thus correspond to determining geolocations of mobile devices based on whether the mobile devices report detecting expected wireless signals (i.e., wireless signals that should be detectable from a reported geolocation of a mobile device based on wireless footprints 312 through 320).

For instance, FIG. 3 depicts various exemplary locations 322 (i.e., locations 322-1 through 322-8) at which a mobile device may report to be. Because of the way different wireless footprints intersect and overlap with respect to different locations 322, system 100 may expect to access a different datapoint for each of locations 322 at which the mobile device may report to be located. For example, a mobile device reporting its geolocation to correlate with location 322-1 may be expected to provide a datapoint indicating that the mobile device detects a set of particular wireless signals that includes only a wireless signal generated by cell tower 302, while a mobile device reporting its geolocation to correlate with location 322-2 may be expected to provide a datapoint indicating that the mobile device detects a set of particular wireless signals that includes both a wireless signal generated by cell tower 302 and a wireless signal generated by Wi-Fi router 306. Other reported locations 322 may similarly correspond to other expected sets of wireless signals as follows: signals generated by wireless signal generators 302, 306, and 308 for location 322-3; a signal generated by cell tower 304 for location 322-4; signals generated by wireless signal generators 302 and 304 for location 322-5; signals generated by wireless signal generators 302, 304, and 308 for location 322-6; signals generated by wireless signal generators 304 and 310 for location 322-7; and no signals generated by any of wireless signal generators 302 through 310 for location 322-8.

If any expected signals are not found in the set of particular wireless signals reported, or if any unexpected signals are found in the set, this may indicate to system 100 that it may be possible (or likely, depending on the circumstances) that the mobile device is not reporting its true geolocation. Conversely, if the reported set of wireless signals detected is identical to an expected set of wireless signals for a reported geolocation, this may indicate that system 100 may more confidently determine that the reported geolocation correlates to the true geolocation of the mobile device.

For instance, in operation, system 100 may access a datapoint that includes data reported by mobile device 202 to indicate that mobile device 202 detects a set of particular wireless signals. As part of determining the custom confidence metric for the reported geolocation 208, system 100 may identify a set of expected wireless signals that the mobile device is expected to detect if the reported geolocation is the true geolocation, compare the set of particular wireless signal detected by mobile device 202 with the set of expected wireless signals, and compute the custom confidence metric based on the comparing of the set of particular wireless signals detected with the set of expected wireless signals.

System 100 may identify the set of expected wireless signals in any suitable manner. For example, system 100 may maintain a real-time database (e.g., within storage facility 108) that includes real-time data about wireless signal generators (e.g., wireless signals generators 302 through 310) and their respective geographical footprints (e.g., wireless footprints 312 through 320). In other examples, system 100 may access such data from an external database such as a database maintained by the same entity that operates system 100 or a database maintained by another entity (e.g., a third party). In other examples, system 100 may access this data in other ways, such as by cross-referencing with other mobile devices in the same general area to identify the expected set of detected signals, cross-referencing with other mobile applications (e.g., which may be unlikely to spoof data) to identify the expected set of detected signals, by communicating with one or more of wireless signal generators 302 through 310 to identify the wireless signal generator and its wireless footprint, or in any other manner as may serve a particular implementation.

While the signal detection corroboration factor illustrated in FIG. 3 may provide a strong level of confidence that a reported geolocation of mobile device 202 correlates or does not correlate with a true geolocation of mobile device 202 in certain examples, in other examples, this factor may provide only a weak level of confidence either way. This is because any datapoint may theoretically be spoofed to indicate a false geolocation, but it may be more difficult to spoof datapoints in real time when many signals are involved than when fewer signals are involved.

Thus, for example, if mobile device 202 reports to be at location 322-6 and reports to detect wireless signals associated with cell tower 302, cell tower 304, and stationary Bluetooth beacon 308 while not reporting to detect wireless signals generated by Wi-Fi router 306 or stationary Bluetooth beacon 310, system 100 may be configured to weigh this information relatively heavily in favor of mobile device 202 being truly located at the reported geolocation, since it may be relatively difficult to spoof such a complex datapoint perfectly (and in real time) if mobile device 202 were not truly located at location 322-6. Similarly, if mobile device 202 reports to be at location 322-6 and reports to detect no wireless signals, system 100 may be configured to weigh this information relatively heavily against mobile device 202 being truly located at the reported geolocation, since it may be highly unlikely that a mobile device truly located at location 322-6 would fail to detect any of the expected wireless signals.

Conversely, if mobile device 202 reports to be at location 322-8, where none of the illustrated wireless signals are expected to be detected, and mobile device 202 indeed reports that no wireless signals are detected, system 100 may be configured to weigh this information relatively lightly in favor of mobile device 202 being truly located at the reported geolocation, since it may be relatively easy to spoof such a simple datapoint in real time even if mobile device 202 were not truly located at location 322-8. Similarly, if mobile device 202 reports to be at location 322-8 and reports to detect one wireless signal generated by cell tower 302, system 100 may be configured to weigh this information relatively lightly against mobile device 202 being truly located at the reported geolocation, since it may be possible that mobile device 202 really did detect the wireless signal generated by cell tower 302 if mobile device 202 is just outside expected wireless footprint 312 (e.g., since the actual footprint may expand and contract based on various conditions, etc.).

Regardless, it will be understood that the signal detection corroboration factor illustrated in FIG. 3, as well as other location corroboration factors described herein, may not be considered to indicate with perfect certainty that there is or is not a correlation between a reported geolocation and a true geolocation of a mobile device. Rather, datapoints associated with different location corroboration factors may each weigh in favor of or against such a correlation to a certain degree that may depend on various circumstances (such as described above) and/or desired customizations indicated by a client (as will be described in more detail below).

To illustrate another location corroboration factor referred to as a signal strength corroboration factor, FIG. 4 shows a cell tower 402 and a Wi-Fi router 404 similar to the cell towers and Wi-Fi router described above in relation to FIG. 3. However, rather than indicating one specific wireless footprint for each of these wireless signal generators (as shown in FIG. 3), FIG. 4 depicts various degrees of signal strength that may be detected for each of wireless signal generators 402 and 404. Specifically, as shown, cell tower 402 may be associated with various degrees of signal strength 406 (e.g., a strong signal strength 406-1 in an area immediately surrounding cell tower 402, a slightly weaker signal strength 406-2 just outside of the area associated with strong signal strength 406-1, and so forth up until a weakest signal strength 406-5 located in an area relatively far away from cell tower 402). Similarly, Wi-Fi router 404 may be associated with various degrees of signal strength 408 (e.g., a strong signal strength 408-1 in an area immediately surrounding Wi-Fi router 404, a slightly weaker signal strength 408-2 just outside of the area associated with strong signal strength 408-1, and a weakest signal strength 408-3 located in an area still further from Wi-Fi router 404). The signal strength corroboration factor illustrated by FIG. 4 may thus correspond to determining geolocations of mobile devices based on whether the mobile devices report detecting wireless signals at expected signal strengths (i.e., signal strengths expected to be detected from a reported geolocation of a mobile device based on the areas demarcated in FIG. 4 to be associated with different signal strengths 406 and 408).

For instance, FIG. 4 depicts various exemplary locations 410 (i.e., locations 410-1 through 410-7) at which a mobile device may report to be. Because of the way different signal strengths intersect and overlap with respect to different locations 410, system 100 may expect to access a different datapoint for each location 410 at which the mobile device may report to be located. For example, a mobile device reporting its geolocation to correlate with location 410-1 may be expected to provide a datapoint indicating that the mobile device detects a wireless signal generated by cell tower 402 at signal strength 406-1 (and does not detect a wireless signal generated by Wi-Fi router 404 at any detectable signal strength), while a mobile device reporting its geolocation to correlate with location 410-2 may be expected to provide a datapoint indicating that the mobile device detects the wireless signal generated by cell tower set at signal strength 406-2 (while still not detecting the wireless signal generated by Wi-Fi router 404). Other reported locations 410 may similarly correspond to other expected signal strengths for wireless signals generated by cell tower 402 and Wi-Fi router 404 as follows: signal strength 406-3 and no detectable signal strength 408 for location 410-3; respective signal strengths 406-3 and 408-3 for location 410-4; respective signal strengths 406-4 and 408-3 for location 410-5; respective signal strengths 406-5 and 408-1 for location 410-6; and respective signal strengths 406-5 and 408-2 for location 410-7.

If the signal strengths reported do not correlate to expected signal strengths for a reported geolocation, this may indicate to system 100 that it may be possible (or likely, depending on the circumstances) that the mobile device is not reporting its true geolocation. Conversely, if the reported signal strengths correlate to expected signal strengths for a reported geolocation, this may indicate that system 100 may more confidently determine that the reported geolocation correlates to the true geolocation of the mobile device.

For instance, in operation, system 100 may access a datapoint that includes data reported by mobile device 202 to indicate that mobile device 202 detects a particular wireless signal at a particular signal strength. As part of determining the custom confidence metric for the reported geolocation 208, system 100 may identify an expected signal strength at which mobile device 202 is expected to detect the particular wireless signal, compare the particular signal strength at which the particular wireless signal is detected with the expected signal strength at which mobile device 202 is expected to detect the particular wireless signal, and compute the custom confidence metric based on the comparing of the particular signal strength with the expected signal strength.

System 100 may identify the expected signal strength in any suitable manner. For example, real-time data relating to expected signal strengths may be included within the same or similar types of real-time databases as described above in relation to FIG. 3 (e.g., a database within storage facility 108, a database external to system 100, etc.). In other examples, system 100 may access this data in other ways, such as by cross-referencing the signal strength with other mobile devices reporting to be in the same general area, cross-referencing the signal strength with other mobile applications, communicating with cell tower 402 or Wi-Fi router 404 directly, or in any other manner as may serve a particular implementation.

While FIG. 4 illustrates discrete levels of signal strengths 406 and 408, it will be understood that, in some implementations, signal strengths may instead be implemented with a courser or finer gradient (e.g., up to and including a continuous gradient). As such, depending on how many signals may be expected to be present at a particular location and how finely the signal strengths are graded, system 100 may accord different amounts of weight to different datapoints characterizing the correlation between the reported geolocation and the true geolocation based on signal strength corroboration factors. For example, system 100 may do this in a similar way as described above in relation to the datapoints characterizing the correlation based on the signal detection corroboration factor described in relation to FIG. 3.

Additionally, while certain types of wireless signal generators are specifically described and illustrated in FIGS. 3 and 4, it will be understood that any types of natural or artificially generated signals from any suitable natural process or wireless signal generator may be used. For instance, wireless signals used in conjunction with either the signal detection or the signal strength corroboration factors may be associated with 3G cellular technology (e.g., providing course location triangulation), 4G LTE technology (e.g., providing precision location triangulation), 5G wireless technology, Wi-Fi technology, Bluetooth technology, or even natural processes (e.g., a barometric pressure "signal" detected by a barometer may be used to effectively determine whether a device is at an expected elevation known to be associated with its reported geolocation).

FIG. 5 illustrates yet another location corroboration factor, this one referred to as a movement feasibility corroboration factor. As shown, FIG. 5 depicts two records 502 (i.e., records 502-1 and 502-2), a movement analysis 504 for the two records, and a graph plotting a move time 506 against a move distance 508 for various exemplary movements 510 (e.g., movements 510-1 through 510-6).

Each record 502 is shown to include a particular time stamp and a location at which a mobile device (e.g., mobile device 202) is detected. For instance, record 502-1 may indicate that mobile device 202 reported its location to be (or was otherwise determined to be located at) location "M" at a particular time "X." Similarly, record 502-2 may indicate that mobile device 202 reported its location to be location "N" at a particular time "Y." Records 502 may be generated at various times and/or locations in different implementations. For example, a record 502 may be generated by mobile device 202 at regular time intervals (e.g., every second, every minute, every ten minutes, etc.). In other examples, a record 502 may be generated by mobile device 202 based on the detected geolocation of mobile device 202 (e.g., every time the location is detected to change by more than a predetermined threshold), based on events (e.g., when mobile device 202 is powered on or off, when a mobile application is started up or closed out, when a network or wireless signal is detected or ceases to be detected, etc.), or based on any other factor as may serve a particular implementation.

The difference between two records such as records 502 may characterize the correlation between a reported geolocation and a true geolocation of mobile device 202 based on how feasible a movement represented by the records is with respect to time. For example, as shown in movement analysis 504, records 502 may be compared and analyzed to determine that mobile device 202 reports that it has moved a distance from M to N in a time Y-X. If the distance from M to N is relatively large (e.g., 5 miles), the time Y-X may also be expected to be relatively large (e.g., long enough to feasibly travel the distance from M to N, such as several minutes in the example where the distance from M to N is 5 miles).

Some of the exemplary movements 510 in the graph of FIG. 5 may be considered to be feasible. That is, some movements 510 represent reasonable distances that mobile device 202 might be expected to move in a given amount of time, thus increasing (or at least not decreasing) the confidence level of system 100 that a reported geolocation correlates to a true geolocation. For example, movement 510-1 may represent a reported movement that took place over a short amount of time (i.e., since it is near the origin of the move time 506 axis), but, because movement 510-1 is also associated with a very short distance (i.e., since it is near the origin of the move distance 508 axis), system 100 may determine that movement 510-1 is feasible and, thus, weighs in favor of (or at least does not weigh against) the correlation between the true geolocation and the reported geolocation of mobile device 202. Similarly, movement 510-2 represents a similarly short distance that mobile device 202 reports to have moved along with a relatively long amount of time, thus making movement 510-2 very feasible. As another example of a feasible movement, movement 510-3 represents a relatively long distance (i.e., since it is positioned far from the origin of the move distance 508 axis) that may be considered feasible because it occurred over a relatively long period of time (i.e., since it is positioned far from the origin of the move time 506 axis).

In certain examples, a threshold curve 512 (e.g., represented as a linear threshold curve in FIG. 5, but which may be understood to have any shape as may serve a particular implementation) drawn onto the graph may separate feasible movements 510 (i.e., those under the curve) from unfeasible movements 510 (i.e., those above the curve). For example, as described above, each of movements 510-1 through 510-3 under the threshold curve may be determined to be feasible movements. Conversely, however, movements 510-4 through 510-6 above the threshold curve may be determined to be unfeasible movements, thus indicating to various degrees that mobile device 202 may be likely to be falsifying its reported geolocation. For example, movement 510-4 is shown to represent a relatively long distance traveled in a very short amount of time (e.g., five miles in one minute). System 100 may determine that such a movement is not likely to be a real movement, and may thus weigh movement 510-4 against the correlation between the true geolocation and the reported geolocation. Movements 510-5 and 510-6 may be closer to being feasible (i.e., since they are positioned nearer to threshold curve 512 on the graph), but may still be considered to be unfeasible or unlikely to be true. For example, even though the move distance 508 associated with movement 510-5 is relatively short, the move time 506 for this movement is so short that even the short distance may be infeasible. Similarly, even though the move time 506 associated with movement 510-6 is relatively long, the movement distance 508 associated with movement 510-6 may be so great as to be unfeasible or unlikely in that amount of time.

In operation, system 100 may access a datapoint that includes movement data reported by mobile device 202, the movement data representative of a first reported geolocation of mobile device 202 associated with a first time (e.g., record 502-1) and a second reported geolocation of mobile device 202 associated with a second time (e.g., record 502-2). The movement data may have sufficient data for system 100 to perform a movement analysis (e.g., movement analysis 504) so that a movement (e.g., one of movements 510) could be plotted on a graph such as shown in FIG. 5 to determine if the movement is below or above a threshold curve (e.g., threshold curve 512). As part of determining the custom confidence metric for the reported geolocation 208, system 100 may determine a feasibility metric based on the movement data and compute the custom confidence metric based on the feasibility metric. For example, the feasibility metric may be indicative of a likelihood that mobile device 202 moved from the first reported geolocation at the first time to the second reported geolocation at the second time. In relation to the graph illustrated in FIG. 5, the feasibility metric may represent where the movement would be positioned on the graph with respect to threshold curve 512 (e.g., whether the movement is above or below the threshold curve, how close the movement is to the threshold curve, etc.).

Various location corroboration factors (e.g., signal detection corroboration factors, signal strength corroboration factors, movement feasibility corroboration factors, etc.) have been described in relation to FIGS. 3 through 5. It will be understood that the principles described in relation to these location corroboration factors may be applied with respect to various scenarios and in relation to various wireless signals, networks, types of records, and so forth, some of which may not be explicitly described herein. Moreover, it will be understood that system 100 may authenticate reported geolocations of mobile devices based on additional location corroboration factors other than those mentioned above.

For example, just as movement may be determined to be "feasible" in relation to how far a mobile device reports to have moved in a particular amount of time, a similar location corroboration factor may relate to determining how likely movements or reported geolocations are in relation to a typical behavior of a user of a mobile device. System 100 may use machine learning or other such techniques to derive typical behavior patterns for a particular user and his or her mobile device (e.g., mobile device 202), and may use conformance to and/or deviation from those typical behavior patterns to help characterize the correlation between the reported geolocation and the true geolocation of the mobile device. For example, if mobile device 202 has reported to be stationary on a desk in an office building every Tuesday at 10:00 AM for the last 50 Tuesdays, it may weigh against the correlation between the true geolocation of mobile device 202 and a reported geolocation if the reported geolocation at 10:00 AM on one Tuesday is across the country at a location that has never before been reported by mobile device 202.

As another example of an additional location corroboration factor, signal detections and/or signal strengths such as those described above in relation to FIGS. 3 and 4 may be reported by systems other than the mobile device. For instance, returning to FIG. 2, a geolocation corroboration system 210 is illustrated as being associated with wireless footprint 206 of the one or more wireless networks and/or wireless signals. Just as mobile device 202 may report which wireless signals it detects and/or the signal strengths at which the wireless signals are detected, geolocation corroboration system 210 may report, for each wireless network or signal, whether mobile device 202 is detected, the signal strength at which mobile device 202 is detected, and so forth.

To this end, geolocation corroboration system 210 may represent a single system associated with a single wireless network or signal, or may represent several separate and independent systems associated with separate and independent wireless networks and signals. For example, geolocation corroboration system 210 may represent cell tower 302, cell tower 304, Wi-Fi router 306, Bluetooth beacon 308, Bluetooth beacon 310, all of these wireless signal generators, or any combination thereof. Thus, rather than relying (or relying solely) on data reported by mobile device 202 itself, system 100 may rely (or further rely) on data reported by the wireless signal generators represented by geolocation corroboration system 210. This may strengthen the authentication further since it may be considerably more difficult to falsify reports relayed by systems independent from mobile device 202 than to falsify reports relayed by mobile device 202. For example, it may be difficult to cause mobile device 202 to properly spoof a reported geolocation of location 322-6 in FIG. 3 or location 410-5 in FIG. 4, but it may be virtually impossible to cause the cell towers and routers generating these signals to properly report, in real time, that they also detect mobile device 202 at these locations if mobile device 202 is not truly located there.

As described above, different datapoints accessed by system 100 may characterize the correlation between the reported geolocation and the true geolocation of mobile device 202 based on any of various location corroboration factors (e.g., the location corroboration factors illustrated by FIGS. 3 through 5, etc.), and may take any suitable form and/or be accessed from any suitable source (e.g., from mobile device 202, from geolocation corroboration system 210, etc.). Based on these datapoints, system 100 may determine a likelihood that the reported geolocation is the true geolocation of mobile device 202.

In some examples, it may be desirable to not only authenticate a reported geolocation of mobile device 202, but to also authenticate a reported geolocation of a user of mobile device 202. For example, as shown in FIG. 2, a user 212 is illustrated as being associated with mobile device 202. For example, mobile device 202 may be implemented by a handheld device such as a smartphone, a tablet device, a laptop computing device, or the like, and user 212 may be an owner and user of that device. In other examples, mobile device 202 may be implemented by an Internet of Things ("IoT") embedded device such as a device built into a vehicle or other mobile object, and user 212 may be associated with the vehicle (e.g., a driver of the vehicle, a passenger in the vehicle, etc.).

Once system 100 determines a confidence metric representative of a likelihood that the reported geolocation is the true geolocation of mobile device 202, system 100 may be configured to determine if user 212 is also located at the reported geolocation with mobile device 202. In this way, system 100 may not only authenticate that mobile device 202 is truly located at a particular reported geolocation (e.g., one of locations 204), but also that user 212 is truly located at the particular reported geolocation. For example, system 100 may be configured to require user 212 to periodically authenticate that he or she is still located with mobile device 202.

In operation, system 100 may receive from mobile device 202 a reported user (i.e., data representative of a reported user) of mobile device 202 and authentication data provided by a true user of the mobile device. For example, the true user may be a person who is actually using mobile device 202 and who provides the authentication data (e.g., a password, a wristband check-in, a biometric scan such as a fingerprint or face scan, etc.) to mobile device 202 when prompted. The reported user may be a person who mobile device 202 reports is using mobile device 202, and may be the same as the true user, or may be different. In response to receiving the data representative of the reported user, system 100 may access expected authentication data associated with the reported user. For example, system 100 may maintain or have access to a database of authentication data (e.g., passwords, biometric scans, etc.) for various potential users including the reported user, and may access expected data with which to compare the received authentication data provided by the true user to determine if the true user is the reported user. Thus, based on the authentication data provided by the true user and based on the expected authentication data, system 100 may determine an additional confidence metric (i.e., a "user confidence metric") representative of a likelihood that the reported user is the true user.

In some examples, system 100 may be configured to receive a reported geolocation of a mobile device, access one or more datapoints characterizing the correlation between the reported geolocation and a true geolocation of the mobile device, and determine a confidence metric representative of a likelihood that the reported geolocation is the true geolocation in a preconfigured and non-customized manner. For example, system 100 may be permanently configured to access particular datapoints associated with particular location corroboration factors and to weigh the information from such datapoints in a particular way that is predetermined to be appropriate for a particular implementation.

In other implementations, system 100 may instead be configured to perform these operations in accordance with customized authentication settings, received from a person who is operating system 100, to authenticate reported geolocations of mobile devices and/or their respective users. For instance, as mentioned above, system 100 may in some examples be configured to provide a geolocation authentication service to a client who may be empowered to customize the operation of system 100. To this end, system 100 may present, to the client of the geolocation authentication service provided by system 100, a user interface configured to facilitate the client in providing user input representative of customized authentication settings to system 100. In these examples, system 100 may thus receive the user input representative of the customized authentication settings by receiving the user input from the client by way of the user interface.

Figure 6:
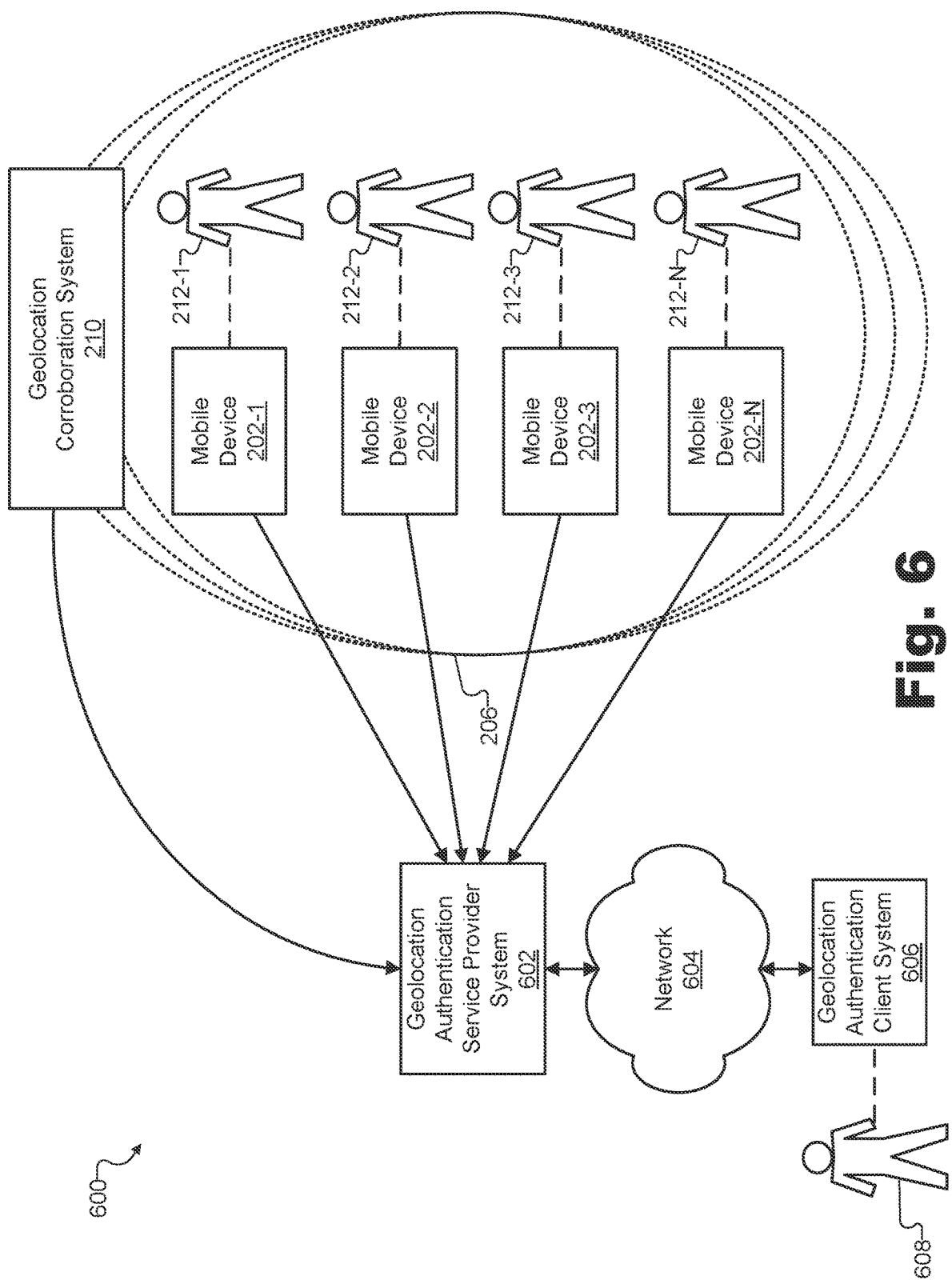
FIG. 6 illustrates an exemplary configuration in which the geolocation authentication system of FIG. 1 may operate to provide a geolocation authentication service customized for a client according to principles described herein.

FIG. 6 illustrates an exemplary configuration 600 in which system 100 may operate to provide a geolocation authentication service customized for a client. Specifically, as shown, configuration 600 includes a geolocation authentication service provider system 602 ("service provider system 602") that is communicatively coupled, by way of a network 604, with a geolocation authentication client system 606 ("client system 606"). Client system 606 is shown to be associated with a client 608, and service provider system 602 is shown to receive data from a plurality of mobile devices 202 (i.e., mobile devices 202-1 through 202-N, each of which may be implementations of mobile device 202 described above), and from an implementation of geolocation corroboration system 210 (which, as described above in relation to FIG. 2, may represent various independent systems each associated with different networks and/or signals represented in the wireless footprints 206 in which mobile devices 202 may be located). As with mobile device 202 described above, each of the implementations of mobile device 202 shown in FIG. 6 (i.e., mobile devices 202-1 through mobile device 202-N) may be located at a geolocation that falls within the wireless footprint of one or more networks or wireless signals (i.e., represented by wireless footprint 206), and may be associated with a respective user 212 (i.e., mobile device 202-1 associated with user 212-1, mobile device 202-2 associated with user 212-2, and so forth up to mobile device 202-N associated with user 212-N).

System 100 may be included within or implemented by service provider system 602 in certain implementations, and may be included within or implemented by client system 606 in other implementations. In these examples, system 100 may "receive" or "access" data from data sources somewhat indirectly (e.g., by way of the other system not implementing system 100). For example, if system 100 is implemented by service provider system 602, customization facility 104 may receive the user input from client 608 indirectly, by way of client system 606 and network 604. As another example, if system 100 is implemented by client system 606, communication facility 102 may be configured to access datapoints from sources such as mobile devices 202 and/or location corroboration system 210 by way of service provider system 602 and network 604.

In still other implementations, system 100 may be partially implemented in either provider system 602 or client system 606, or may be partially implemented in both service provider system 602 and client system 606 (i.e., distributed across both systems 602 and 606). For example, customization facility 104 may be implemented by client system 604 to present a user interface to client 608 and facilitate receiving user input from client 608 as described above. Confidence determination facility 106 and storage facility 108 (or at least a portion of storage facility 108) may be implemented within service provider system 602, which may access datapoints from storage facility 108, mobile devices 202, location corroboration system 210, and so forth, and process these datapoints along with reported geolocations of mobile devices 202 to determine custom confidence metrics for mobile devices 202. Different aspects of communication facility 102 may be implemented within both service provider system 602 and client system 606 to enable the datapoints to be accessed and to enable systems 602 and 606 to intercommunicate by way of network 604.

As shown in FIG. 6, the geolocation authentication service serving client 608 to allow client 608 to customize how reported geolocations of mobile devices 202 are authenticated may be set up as a server-client service. For example, service provider system 602 may include one or more computing devices such as applications servers operated by a service provider and configured to provide the geolocation authentication service to client 608 based on an application running on client system 606, which may be a personal computing device (e.g., a mobile device, a PC, a laptop, etc.) used by client 608.

Network 604 may provide data delivery means between server-side systems such as service provider system 602 and client-side systems such as client system 606 in the server-client data delivery architecture illustrated by configuration 600. As such, network 604 may include a provider-specific wired or wireless network (e.g., a cable or satellite carrier network or a mobile telephone network), the Internet, a wide area network, a content delivery network, and/or any other suitable network or networks, and data may be distributed using any suitable communication technologies included within network 604. As such, data may flow between service provider system 602 and client system 606 using any communication technologies, devices, media, and protocols as may serve a particular implementation.

In some examples, various aspects of network 604 may be the same as, may overlap with, or may be otherwise related to the networks and wireless signals associated with wireless footprint 206. For example, client system 606 may be implemented, in certain examples, as a mobile device communicating via the same wireless carrier networks (and communicating with certain of the same cell towers, etc.) as one or more of mobile devices 202.

System 100 may receive and use user input from client 608 to customize the operation of system 100 in any of the ways described herein. In certain implementations, user input may be specific to client 608 and his or her institutional goals. Thus, a geolocation authentication service used by various clients including client 608 may be configured to operate in a different customized way for each different client. Additionally or alternatively, the user input may be specific to particular users 212 (e.g., reflecting that certain users 212 may be more trusted by client 608 than other users 212, etc.), to particular time periods (e.g., reflecting that increased security or scrutiny may be implemented temporarily or at specific times), to particular situations (e.g., reflecting differences in authentication procedures that may be appropriate when users 212 are traveling, are requesting certain types of access, are logged in in a certain way, etc.), or to any other contextual situation as may serve a particular implementation.

System 100 may perform the operations described herein in any suitable order. For instance, in certain implementations, system 100 may be configured to receive the user input representative of the customized authentication settings from client 608 prior to accessing any datapoints from mobile devices 202 and/or geolocation corroboration system 210. In this way, the accessing of datapoints may be performed based on location corroboration factors designated within the customized authentication settings, and system 100 may avoid the inefficiency of accessing any data that is unimportant to client 608 based on the location corroboration factors designated in the customized authentication settings. In other implementations, system 100 may be configured to receive the user input subsequent to the accessing of the datapoint or datapoints from mobile devices 202 and/or geolocation corroboration system 210. In this way, all the available datapoints based on each of the plurality of location corroboration factors may be available such that the customized authentication settings may determine which data to use and how to weight the data. However, in some such examples, it will be understood that not every accessed datapoint may be designated, but, rather, that at least one additional datapoint may be accessed that characterizes the correlation between the reported geolocation and the true geolocation based on an undesignated location corroboration factor from the plurality of location corroboration factors.

In order to fully customize the geolocation authentication service provided by system 100, various customizations may be represented within the customized authentication settings received in the user input from client 608. For instance, in some examples, the customized authentication settings may include designations of both a first location corroboration factor and an additional location corroboration factor from the plurality of location corroboration factors, as well as respective weight values corresponding to each of the location corroboration factors (i.e., a first weight value corresponding to the first location corroboration factor and an additional weight value corresponding to the additional location corroboration factor). As such, system 100 may access not only the datapoint that characterizes the correlation between the reported geolocation and the true geolocation based on the first location corroboration factor, but may further access an additional datapoint that further characterizes the correlation based on the additional location corroboration factor. System 100 may then determine the custom confidence metric further based on the additional datapoint and in accordance with the respective weight values (i.e., the first weight value and the additional weight value).

Figure 8:
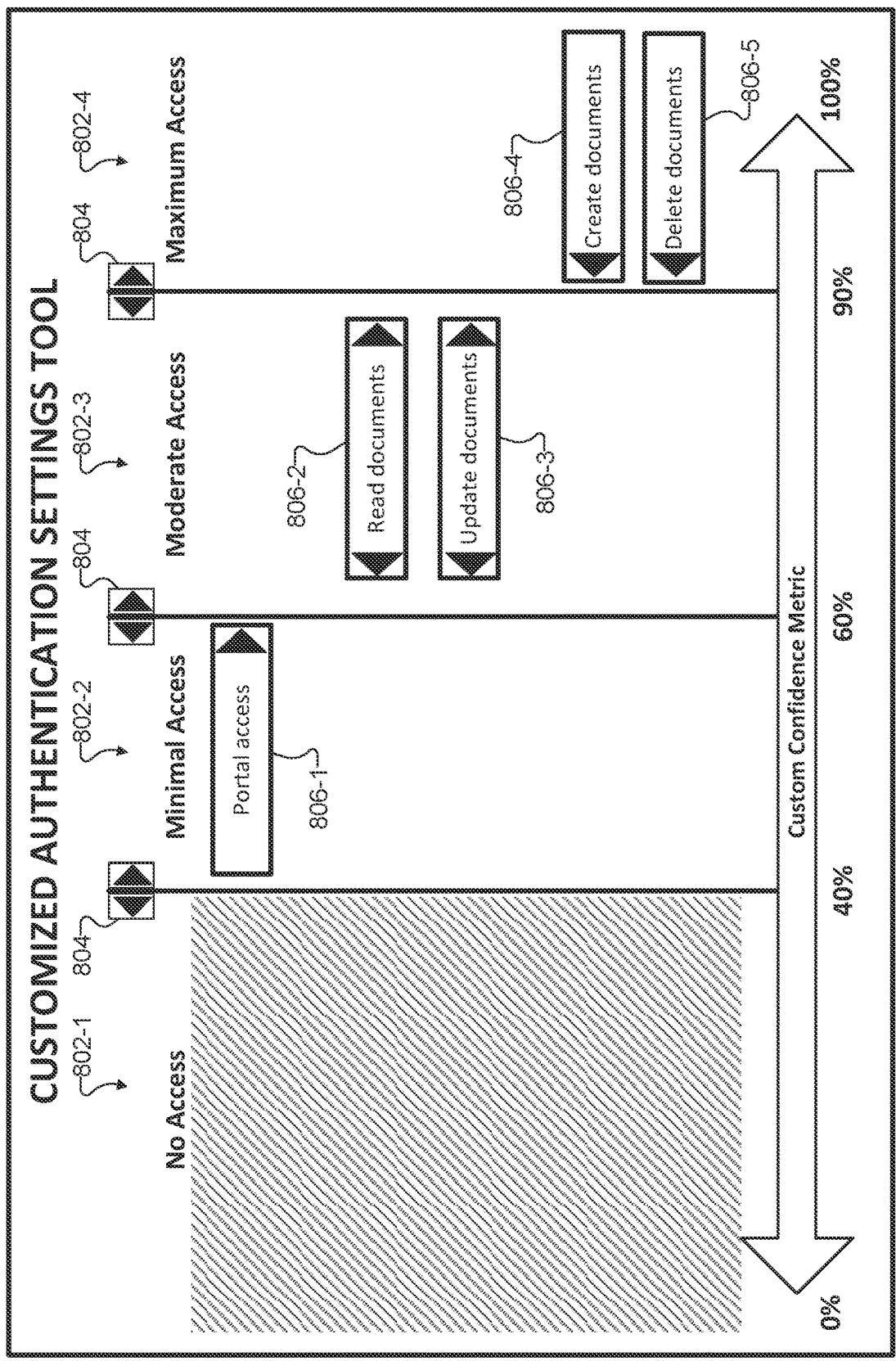

To this end, system 100 (e.g., as implemented by client system 606 or by way of client system 606) may include, provide, or otherwise be associated with a tool (e.g., a graphical user interface ("GUI"), a command line interface, an application programming interface ("API"), a software development kit ("SDK"), etc.) configured to facilitate client 608 in providing the user input to be received by system 100. To illustrate, FIGS. 7 and 8 illustrate exemplary aspects of a customized authentication settings tool used to facilitate client 608 in providing user input to system 100.

First referring to FIG. 7, a graphical user interface 700 ("GUI 700") is shown that facilitates client 608 in designating certain location corroboration factors from a plurality of available location corroboration factors, as well as facilitates client 608 in assigning weight values to each designated location corroboration factor. As shown, GUI 700 includes a first column of checkboxes 702 corresponding to different available location corroboration factors 704. Location corroboration factors 704 may include various factors divided into various categories such as the factors and categories explicitly illustrated or other factors and/or categories described herein or as may serve a particular implementation. A distinct checkbox 702 may be associated with each separate factor, allowing client 608 to designate location corroboration factors 704 by checking the associated checkbox 702 for factors 704 desired by client 608, while leaving other factors 704 undesignated by leaving the associated checkboxes unchecked.

In certain examples, each location corroboration factor 704 may be associated with a preconfigured weight, may be automatically assigned an equal weight, or may otherwise be weighted in a non-customized way (e.g., according to predefined default settings). In other examples, the weight value accorded to each designated location corroboration factor 704 may be customized by client 608. For instance, as shown, a third column within GUI 700 includes weight value input boxes 706 within which client 608 may assign weight values to designated location corroboration factors 704. For example, as shown, designated location corroboration factors 704 may correspond to editable input boxes 706 within which client 608 may input percentage values that add up to 100%, while undesignated location corroboration factors 704 may correspond to grayed-out input boxes 706 which do not allow text to be entered (i.e., because undesignated location corroboration factors are associated with zero weight in the final custom confidence metric).

Various aspects may be taken into account when determining which location corroboration factors 704 to designate and which weight values to assign to each. For example, client 608 may consider some or all of the following aspects, or they may be accounted for in default weight settings preassigned to designated location corroboration factors 704. One aspect to be taken into account, for instance, is how difficult a particular signal is to spoof for the types of users 212 anticipated to be using mobile devices 202. Another aspect to be taken into account is how much a particular wireless signal may be expected to change in real time. Still other aspects to be taken into account may include how easy it would be to determine what real-time signals need to be spoofed to credibly falsify a reported geolocation, how easy it would be to access particular databases associated with particular wireless signals, how reliable and predicable particular wireless signals and signal strengths are, and so forth.

In certain implementations, client 608 may provide user input designating only a subset (i.e., one or more, but less than all) of the available location corroboration factors 704 by checking a subset of checkboxes 702. In such examples, the weight values may be predetermined or may be associated with recommended default values that client 608 may modify as desired. In other examples, all of the available location corroboration factors may be automatically selected and client 608 may designate one or more location corroboration factors by assigning weights (e.g., including a weight of 0% for factors that are unimportant to client 608) to each location corroboration factor 704.

It will be understood that, while datapoints associated with location corroboration factors 704 may be weighted against one another in accordance with default or assigned weight values such as those illustrated in input boxes 706, each datapoint may also carry a variable amount of weight based on the circumstances in which the datapoint is determined. For instance, certain datapoints determined for certain location corroboration factors 704 may be converted into simple, discrete values (e.g., a '1' for a datapoint weighing in favor of the correlation between the true geolocation and the reported geolocation, and a '0' for a datapoint weighing against the correlation, or the like), while other datapoints determined for other location corroboration factors 704 may be more nuanced. For example, rather than a '1' or a '0', certain datapoints may be normalized to represent any decimal number between 0 and 1 to account for how much weight the datapoint is to be accorded based on the circumstances. Such values may help account, for example, for how close to threshold curve 512 a particular movement is (see FIG. 5), how many signal detections or signal strengths would need to be spoofed to falsify a signal (e.g., to differentiate between weight to be given to a datapoint associated with location 322-6 versus location 322-8 in FIG. 3, or location 410-1 versus 410-5 in FIG. 4), or any of the other weighting techniques described above or as may serve a particular implementation.

Based on a custom confidence metric determined based on the customized authentication settings, it may be desirable to grant certain users 212 a greater or a lesser amount of access privileges with respect to certain functionality or data associated with a particular program or system. For example, the determined custom confidence metric may be a particular percentage between 0% (the true geolocation of the mobile device has no correlation with the reported geolocation of the mobile device) and 100% (the true geolocation of the mobile device has perfect correlation with the reported geolocation of the mobile device), and certain thresholds between 0% and 100% may correspond to different access levels as may be further customized by client 608. For instance, an access server (e.g., a server facilitating the functionality of a particular mobile application or the like) may be configured to perform certain operations (e.g., release or charge money or points, dispatch services, etc.) when a particular mobile device 202 meets at least a certain threshold confidence metric so as to avoid fraud or other undesirable situations caused by mobile devices 202 that may be spoofing their reported geolocations to be different than their true geolocations. As another example, only certain mobile devices 202 and/or users 212 (e.g., mobile devices 202 whose confidence metrics exceed a certain threshold and/or users 212 whose user confidence metrics exceed a certain threshold) may be granted privileges to access and/or modify certain portals and/or data.

As with other customizable aspects described above, user access levels may be fully predetermined, may be associated with adjustable default values, or may be fully customizable by client 608 of geolocation authentication service. For instance, in some examples, the customized authentication settings represented by the received user input may further designate threshold settings defining a plurality of access levels to be granted to mobile devices 202 based on confidence metrics associated with determined geolocations of mobile devices 202. As such, system 100 may assign, based on the custom confidence metrics and the threshold settings, different access levels from the plurality of access levels to different mobile devices 202. For example, each access level may define, for whatever mobile device 202 to which it is assigned, access privileges granted to the mobile device 202 with respect to an access server associated with system 100.

The tool provided by client system 606 (e.g., one aspect of which is illustrated in FIG. 7 as GUI 700) may further be used to facilitate client 608 in setting up this access level customization. For example, referring to FIG. 8, a graphical user interface 800 ("GUI 800") is shown that facilitates client 608 in designating certain threshold settings defining a plurality of access levels to be granted to mobile devices 202 based on their respective confidence metrics.

As shown, GUI 800 includes several access categories 802 (i.e., access categories 802-1 through 802-4) corresponding to different custom confidence metrics (i.e., percentages between 0% and 100% as laid out along the bottom of GUI 800). Specifically, a first access category 802-1 granting "No Access" is assigned to custom confidence metrics between 0% and 40% (i.e., custom confidence metrics indicating that a reported geolocation likely is not the true geolocation), a second access category 802-2 granting "Minimal Access" is assigned to custom confidence metrics between 40% and 60% (i.e., custom confidence metrics indicating a greater possibility that a reported geolocation may be the true geolocation), a third access category 802-3 granting "Moderate Access" is assigned to custom confidence metrics between 60% and 90% (i.e., custom confidence metrics indicating that a reported geolocation is likely, but not certain, to be the true geolocation), and a fourth access category 802-4 granting "Maximum Access" is assigned to custom confidence metrics between 90% and 100% (i.e., custom confidence metrics indicating that a reported geolocation is almost certainly the true geolocation). While four categories are illustrated in GUI 800, it will be understood that more or fewer categories, including a custom number of categories, may be employed in certain implementations.

Movable dividers 804 are illustrated to separate each access category 802 from one other. Thus, for example, if client 608 wishes to grant no access to any mobile device 202 with less than a 50% chance of being truly located at its reported geolocation, client 608 may use GUI 800 to move the divider 804 between access categories 802-1 and 802-2 to the right (i.e., to align with 50%). The other dividers 804 may similarly be moved, or may be added, removed, or otherwise modified by client 608 in any way client 608 wishes.

Within each access category 802, one or more actions 806 (e.g., actions 806-1 through 806-5) may be placed to require at least that level of access to perform the particular action 806. For example, "portal access" action 806-1 may be included in minimal access category 802-2, indicating that any mobile device 202 that has a custom confidence metric of at least 40% may access a portal provided by the access server. In other examples, mobile devices 202 with at least moderate access (i.e., having at least a custom confidence metric of 60%) may perform a "read documents" action 806-2 and an "update documents" 806-3, and only mobile devices 202 with maximum access may perform a "create documents" action 806-4 or a "delete documents" action 806-5. As indicated by the arrow on each action 806, actions 806 may be moved from one access category 802 to another by client 608 to further customize the access levels as client 608 may desire.

Figure 9:
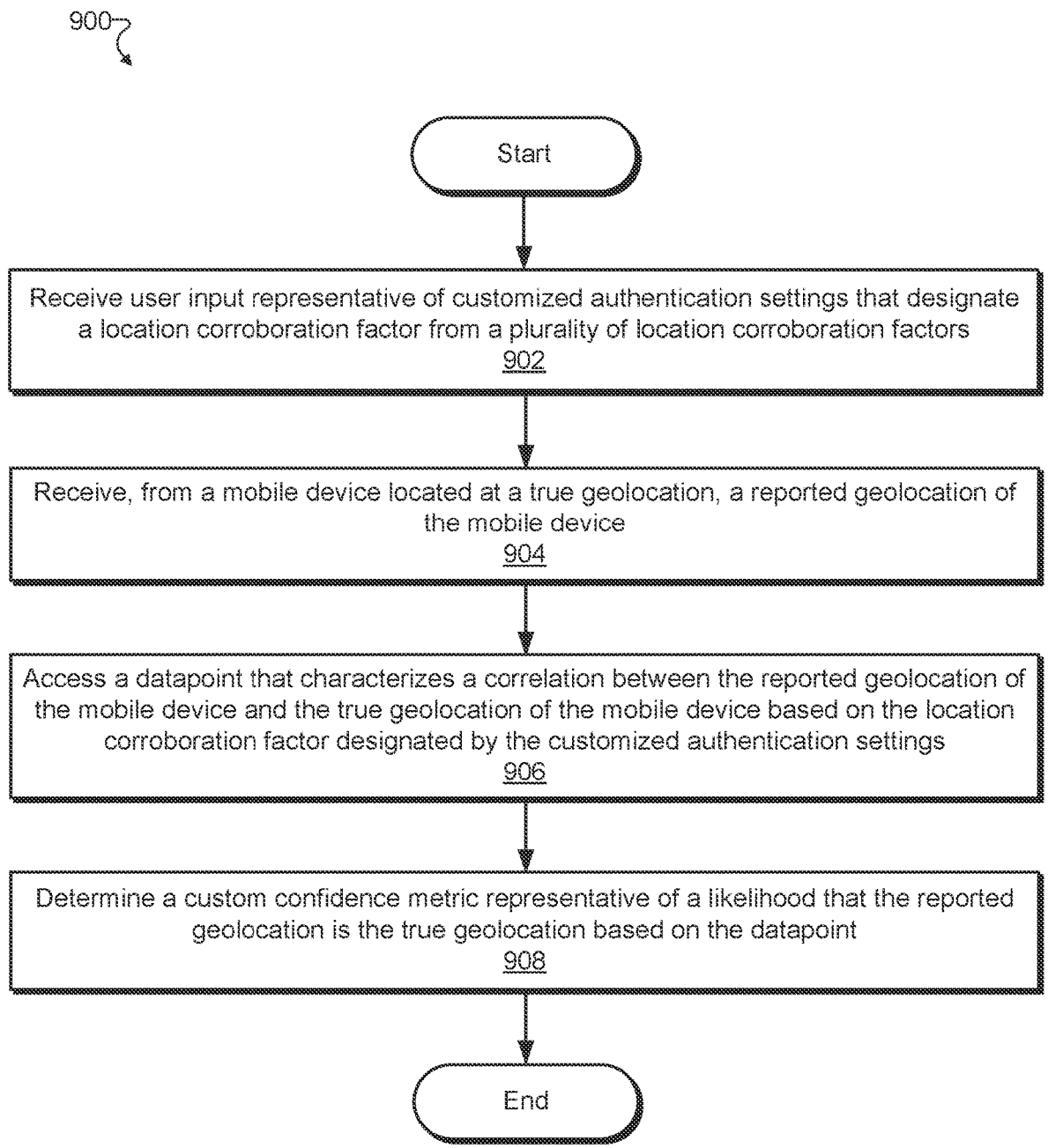
FIGS. 9 and 10 illustrate exemplary methods for authenticating a reported geolocation of a mobile device according to principles described herein.

FIG. 9 illustrates an exemplary method 900 for authenticating a reported geolocation of a mobile device. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a geolocation authentication system may receive user input representative of customized authentication settings. In some examples, the customized authentication settings represented in the user input may designate a location corroboration factor from a plurality of location corroboration factors that correspond to independent ways of determining geolocations of mobile devices. Operation 902 may be performed in any of the ways described herein.

In operation 904, the geolocation authentication system may receive, from a mobile device located at a true geolocation, a reported geolocation of the mobile device. Operation 904 may be performed in any of the ways described herein.

In operation 906, the geolocation authentication system may access a datapoint that characterizes a correlation between the reported geolocation of the mobile device and the true geolocation of the mobile device. For example, the accessing of the datapoint in operation 906 may be performed in response to the receiving of the reported geolocation in operation 904, and the datapoint may characterize the correlation based on the location corroboration factor designated by the customized authentication settings received in operation 902. Operation 906 may be performed in any of the ways described herein.

In operation 908, the geolocation authentication system may determine a custom confidence metric based on the datapoint. The custom confidence metric may be representative of a likelihood that the reported geolocation is the true geolocation. Operation 908 may be performed in any of the ways described herein.

Figure 10:
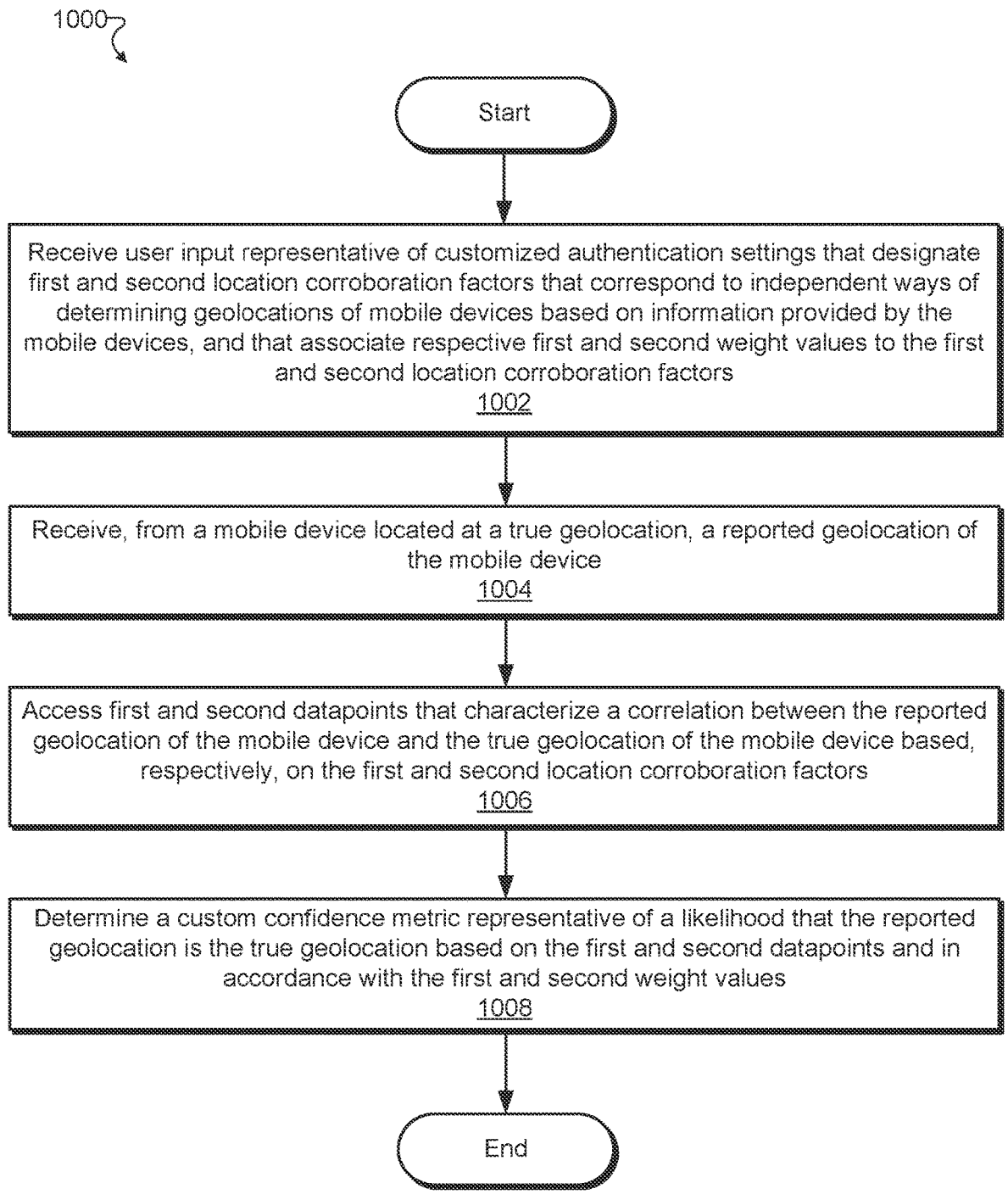

FIG. 10 illustrates an exemplary method 1000 for authenticating a reported geolocation of a mobile device. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a geolocation authentication system may receive user input from a client of a geolocation authentication service provided by the geolocation authentication system. In some examples, the geolocation authentication system may receive the user input from the client by way of a user interface presented by the geolocation authentication system. The user input may be representative of customized authentication settings that designate a first location corroboration factor and a second location corroboration factor from a plurality of location corroboration factors that correspond to independent ways of determining geolocations of mobile devices based on information provided by the mobile devices. Additionally, the customized authentication settings may associate a first weight value and a second weight value, respectively, to the first and second location corroboration factors. Operation 1002 may be performed in any of the ways described herein.

In operation 1004, the geolocation authentication system may receive, from a mobile device located at a true geolocation, a reported geolocation of the mobile device. Operation 1004 may be performed in any of the ways described herein.

In operation 1006, the geolocation authentication system may access a first datapoint and a second datapoint from the mobile device. For example, the geolocation authentication system may access the datapoints in operation 1006 in response to the receiving of the reported geolocation in operation 1004. In some examples, the first datapoint characterizes a correlation between the reported geolocation of the mobile device and the true geolocation of the mobile device based on the first location corroboration factor, while the second datapoint further characterizes the correlation between the reported geolocation and the true geolocation based on the second location corroboration factor. Operation 1006 may be performed in any of the ways described herein.

In operation 1008, the geolocation authentication system may determine a custom confidence metric representative of a likelihood that the reported geolocation is the true geolocation. For instance, the geolocation authentication system may determine the custom confidence metric in operation 1008 based on the first and second datapoints and in accordance with the first and second weight values received in operation 1002 within the customized authentication settings. Operation 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
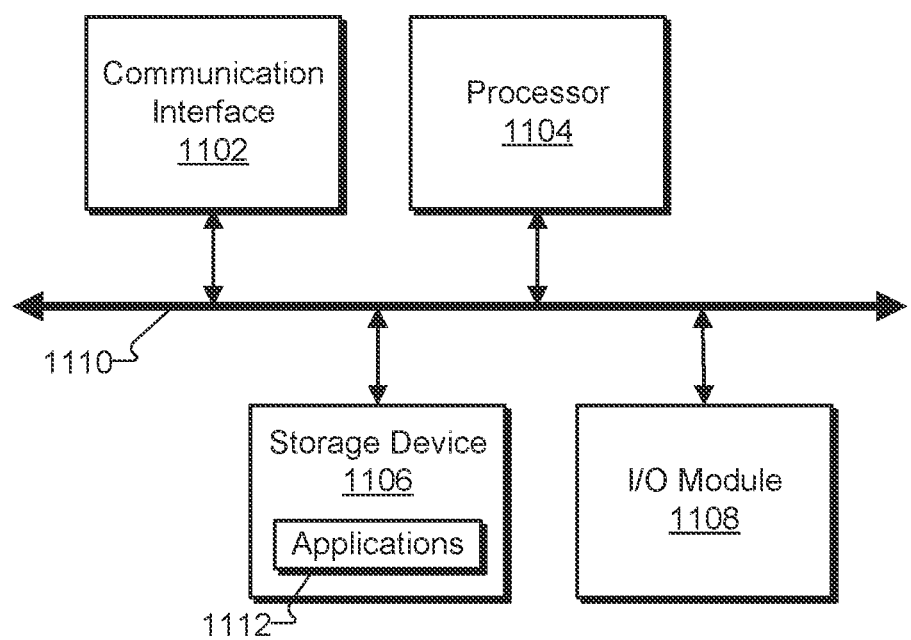
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 through 106 of system 100. Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   designating, by a geolocation authentication system and based on user input representative of customized authentication settings for the geolocation authentication system, a plurality of location corroboration factors including a movement feasibility corroboration factor and a signal detection corroboration factor for the geolocation authentication system to authenticate geolocations of mobile devices;
   determining, by the geolocation authentication system and based on the designating of the movement feasibility corroboration factor, a first reported geolocation of a mobile device associated with a first time and a second reported geolocation of the mobile device associated with a second time, wherein the mobile device is located at a true geolocation at the second time;
   determining, by the geolocation authentication system and based on the first and second reported geolocations of the mobile device, a feasibility metric indicative of a likelihood that the second reported geolocation of the mobile device is the true geolocation at the second time; and
   determining, by the geolocation authentication system, a datapoint that characterizes, in accordance with the signal detection corroboration factor, a correlation between the second reported geolocation and the true geolocation of the mobile device at the second time, wherein the datapoint is further indicative of the likelihood that the second reported geolocation of the mobile device is the true geolocation at the second time and is based on:
      data reported by the mobile device to indicate a first plurality of wireless signals that has been detected by the mobile device at the second reported geolocation of the mobile device, and
      data accessed from a geolocation corroboration system separate and independent from the mobile device to indicate a second plurality of wireless signals that the mobile device is expected to detect if the second reported geolocation is the true geolocation of the mobile device.

2. The method of claim 1, wherein the determining of the feasibility metric includes performing a movement analysis in which a movement of the mobile device from the first reported geolocation at the first time to the second reported geolocation at the second time is compared to a threshold curve to determine the feasibility metric based on how close the movement is to the threshold curve.

3. The method of claim 1, further comprising:
   designating, by the geolocation authentication system and based on the user input representative of the customized authentication settings, threshold settings defining a plurality of access levels to be granted based on confidence metrics associated with the authenticated geolocations of the mobile devices;
   determining, by the geolocation authentication system, a particular confidence metric representative of a confidence level for the feasibility metric; and
   assigning, by the geolocation authentication system and based on the threshold settings and the particular confidence metric, a particular access level of the plurality of access levels to the mobile device, the particular access level defining access privileges granted to the mobile device with respect to an access server.

4. The method of claim 1, wherein:
   the plurality of location corroboration factors designated based on the user input further includes a signal strength corroboration factor;
   the method further comprises determining, by the geolocation authentication system, an additional datapoint that characterizes, in accordance with the signal strength corroboration factor, the correlation between the second reported geolocation and the true geolocation of the mobile device at the second time; and the additional datapoint is further indicative of the likelihood that the second reported geolocation of the mobile device is the true geolocation at the second time and is based on:
    data reported by the mobile device to indicate that the mobile device detects a particular wireless signal at a particular signal strength, and
    data accessed from the geolocation corroboration system separate and independent from the mobile device to corroborate the data reported by the mobile device.

5. The method of claim 1, further comprising:
identifying, by the geolocation authentication system, a reported user of the mobile device and authentication data provided by a true user of the mobile device;
accessing, by the geolocation authentication system, expected authentication data associated with the reported user of the mobile device; and
determining, by the geolocation authentication system based on the authentication data provided by the true user and the expected authentication data, a user confidence metric indicative of a likelihood that the reported user is the true user.

6. The method of claim 1, wherein:
each of the plurality of location corroboration factors correspond to independent ways of authenticating the geolocations of the mobile devices; and
the method further comprises determining, by the geolocation authentication system and based on the feasibility metric and one or more additional metrics associated with the plurality of location corroboration factors, a custom confidence metric indicative of the likelihood that the second reported geolocation is the true geolocation at the second time.

7. The method of claim 6, wherein:
the customized authentication settings include respective weight values corresponding to each of the plurality of location corroboration factors including the movement feasibility corroboration factor; and
the determining of the custom confidence metric is further based on the respective weight values.

8. The method of claim 6, wherein the determining of the custom confidence metric includes:
    identifying an expected signal strength at which the mobile device is expected to detect a particular wireless signal;
    comparing a particular signal strength at which the particular wireless signal is detected with the expected signal strength at which the mobile device is expected to detect the particular wireless signal; and
    computing the custom confidence metric based on the comparing of the particular signal strength with the expected signal strength.

9. The method of claim 6, wherein the determining of the custom confidence metric includes:
    comparing the first plurality of wireless signals with the second plurality of wireless signals; and
    computing the custom confidence metric based on the comparing of the first and second pluralities of wireless signals.

10. A system comprising:
a memory storing instructions; and
a processor communicatively coupled to the memory and configured to execute the instructions to:
    designate, based on user input representative of customized authentication settings for the system, a plurality of location corroboration factors including a movement feasibility corroboration factor and a signal detection corroboration factor for the system to authenticate geolocations of mobile devices;
    determine, based on the designating of the movement feasibility corroboration factor, a first reported geolocation of a mobile device associated with a first time and a second reported geolocation of the mobile device associated with a second time, wherein the mobile device is located at a true geolocation at the second time;
    determine, based on the first and second reported geolocations of the mobile device, a feasibility metric indicative of a likelihood that the second reported geolocation of the mobile device is the true geolocation at the second time; and
    determine a datapoint that characterizes, in accordance with the signal detection corroboration factor, a correlation between the second reported geolocation and the true geolocation of the mobile device at the second time, wherein the datapoint is further indicative of the likelihood that the second reported geolocation of the mobile device is the true geolocation at the second time and is based on:
        data reported by the mobile device to indicate a first plurality of wireless signals that has been detected by the mobile device at the second reported geolocation of the mobile device, and
        data accessed from a geolocation corroboration system separate and independent from the mobile device to indicate a second plurality of wireless signals that the mobile device is expected to detect if the second reported geolocation is the true geolocation of the mobile device.

11. The system of claim 10, wherein the determining of the feasibility metric includes performing a movement analysis in which a movement of the mobile device from the first reported geolocation at the first time to the second reported geolocation at the second time is compared to a threshold curve to determine the feasibility metric based on how close the movement is to the threshold curve.

12. The system of claim 10, wherein the processor is further configured to execute the instructions to:
    designate, based on the user input representative of the customized authentication settings, threshold settings defining a plurality of access levels to be granted based on confidence metrics associated with the authenticated geolocations of the mobile devices;
    determine a particular confidence metric representative of a confidence level for the feasibility metric; and
    assign, based on the threshold settings and the particular confidence metric, a particular access level of the plurality of access levels to the mobile device, the particular access level defining access privileges granted to the mobile device with respect to an access server.

13. The system of claim 10, wherein:
the plurality of location corroboration factors designated based on the user input further includes a signal strength corroboration factor;
the processor is further configured to execute the instructions to determine an additional datapoint that characterizes, in accordance with the signal strength corroboration factor, the correlation between the second reported geolocation and the true geolocation of the mobile device at the second time; and the additional datapoint is further indicative of the likelihood that the second reported geolocation of the mobile device is the true geolocation at the second time and is based on:
data reported by the mobile device to indicate that the mobile device detects a particular wireless signal at a particular signal strength, and
data accessed from the geolocation corroboration system separate and independent from the mobile device to corroborate the data reported by the mobile.

14. The system of claim 10, wherein:
each of the plurality of location corroboration factors correspond to independent ways of authenticating the geolocations of the mobile devices; and
the processor is further configured to execute the instructions to determine, based on the feasibility metric and one or more additional metrics associated with the plurality of location corroboration factors, a custom confidence metric indicative of the likelihood that the second reported geolocation is the true geolocation at the second time.

15. The system of claim 14, wherein:
the customized authentication settings include respective weight values corresponding to each of the plurality of location corroboration factors including the movement feasibility corroboration factor; and
the determining of the custom confidence metric is further based on the respective weight values.

16. The system of claim 14, wherein the determining of the custom confidence metric includes:
identifying an expected signal strength at which the mobile device is expected to detect a particular wireless signal;
comparing a particular signal strength at which the particular wireless signal is detected with the expected signal strength at which the mobile device is expected to detect the particular wireless signal; and
computing the custom confidence metric based on the comparing of the particular signal strength with the expected signal strength.

17. The system of claim 14, wherein the determining of the custom confidence metric includes:
comparing the first plurality of wireless signals with the second plurality of wireless signals; and
computing the custom confidence metric based on the comparing of the first and second pluralities of wireless signals.

18. The system of claim 10, wherein the processor is further configured to execute the instructions to:
identify a reported user of the mobile device and authentication data provided by a true user of the mobile device;
access expected authentication data associated with the reported user of the mobile device; and
determine, based on the authentication data provided by the true user and the expected authentication data, a user confidence metric indicative of a likelihood that the reported user is the true user.

19. A non-transitory computer-readable medium storing instructions that, when executed, direct a processor of a computing device to:
designate, based on user input representative of customized authentication settings for the computing device, a plurality of location corroboration factors including a movement feasibility corroboration factor and a signal detection corroboration factor for the computing device to authenticate geolocations of mobile devices;
determine, based on the designating of the movement feasibility corroboration factor, a first reported geolocation of a mobile device associated with a first time and a second reported geolocation of the mobile device associated with a second time, wherein the mobile device is located at a true geolocation at the second time;
determine, based on the first and second reported geolocations of the mobile device, a feasibility metric indicative of a likelihood that the second reported geolocation of the mobile device is the true geolocation at the second time; and
determine a datapoint that characterizes, in accordance with the signal detection corroboration factor, a correlation between the second reported geolocation and the true geolocation of the mobile device at the second time, wherein the datapoint is further indicative of the likelihood that the second reported geolocation of the mobile device is the true geolocation at the second time and is based on:
data reported by the mobile device to indicate a first plurality of wireless signals that has been detected by the mobile device at the second reported geolocation of the mobile device, and
data accessed from a geolocation corroboration system separate and independent from the mobile device to indicate a second plurality of wireless signals that the mobile device is expected to detect if the second reported geolocation is the true geolocation of the mobile device.

20. The non-transitory computer-readable medium of claim 19, wherein:
the plurality of location corroboration factors designated based on the user input further includes a signal strength corroboration factor;
the processor is further configured to execute the instructions to determine an additional datapoint that characterizes, in accordance with the signal strength corroboration factor, the correlation between the second reported geolocation and the true geolocation of the mobile device at the second time; and
the additional datapoint is further indicative of the likelihood that the second reported geolocation of the mobile device is the true geolocation at the second time and is based on:
data reported by the mobile device to indicate that the mobile device detects a particular wireless signal at a particular signal strength, and
data accessed from the geolocation corroboration system separate and independent from the mobile device to corroborate the data reported by the mobile device.

* * * * *